United States Patent [19]
Mostashari

[11] Patent Number: 5,106,141
[45] Date of Patent: Apr. 21, 1992

[54] MOTORIZED MOBILE OFFICE

[76] Inventor: Seyed M. Mostashari, 3901 Tunlaw Rd. NW, #103, Washington, D.C. 20007

[21] Appl. No.: 525,052

[22] Filed: May 18, 1990

[51] Int. Cl.$^5$ .............................................. B60P 3/14
[52] U.S. Cl. ................................... 296/24.1; 108/116; 108/144; 5/118
[58] Field of Search ................... 296/24.1, 26; 52/36

[56] References Cited

U.S. PATENT DOCUMENTS

| | | | |
|---|---|---|---|
| 2,677,571 | 5/1954 | Williams | 296/24.1 |
| 3,806,183 | 4/1974 | Sieren et al. | 296/24.1 |
| 3,874,009 | 4/1975 | Nosaka et al. | 5/118 |
| 4,011,404 | 3/1977 | Graham | 296/26 |
| 4,470,228 | 9/1984 | Dirck | 296/24.1 |
| 4,535,933 | 8/1985 | Kuiper | 296/22 |
| 4,550,946 | 11/1985 | Hanemaayer | 296/24.1 |
| 4,666,204 | 5/1987 | Reinholtz | 296/24.1 |
| 4,712,822 | 12/1987 | Janos et al. | 296/24.1 |
| 4,738,480 | 4/1988 | Ward | 296/24.1 |
| 4,867,498 | 9/1989 | Delphia et al. | 296/37.8 |

*Primary Examiner*—Robert R. Song

[57] ABSTRACT

A motorized mobile office vehicle, a van type vehicle, having an interior arranged to form a mobile office that would take optimum advantage of the available space to accommodate all the necessities and amenities a business person would require for business related travel. In general, the forward section of the van generally contain two swivel type chairs. An overhead compartment between the two front seats that houses a slide projector, CB radio, overhead light, and tissue dispenser. The console between the front seats houses cellular telephone, map holder, note pad holder, cassette holder, and miscellaneous item holder and AM/FM radio. Centrally located in the vehicle interior, there is a multi functional unit used as display space of business literature, projection screen, drafting desk, presentations board holder, and regular desk top for performing various office work. Over this equipment there is an adjustable task light. Adjacent to the multi functional equipment, there is a complete work station for the performing various business activities called Business Activity Center (BAC). BAC Includes, a book shelf, personal locker, computer and various peripherals, cellular phone, coffee maker, coat closet, utility box, safe and a refrigerator. Next to BAC, there is an executive chair mounted over a luggage compartment. Above this chair is a roll-up bed, and behind it, there are special protector tubes providing protection for drawings and blueprints. On the passenger side of the vehicle, there is another equipment housing audio visual equipments as well as equipments for personal hygiene. On top of the roof of the vehicle there is a roof top unit shaped as a aerodynamic wind spoiler housing various communication antennas and space for additional luggage storage.

16 Claims, 25 Drawing Sheets

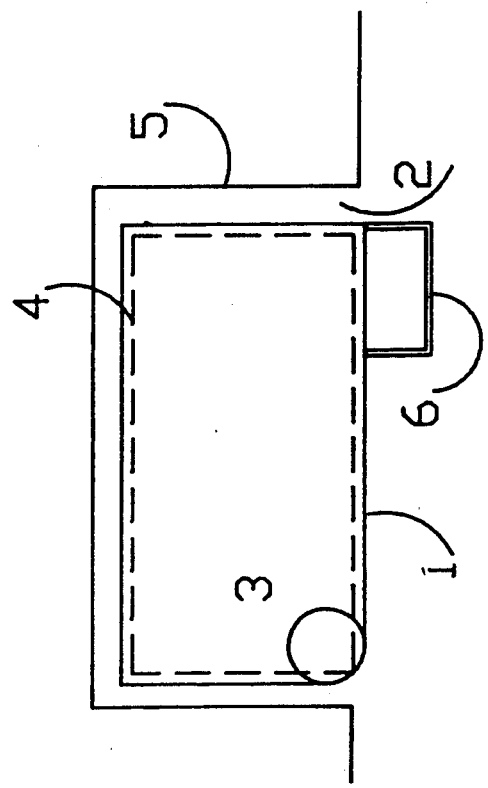
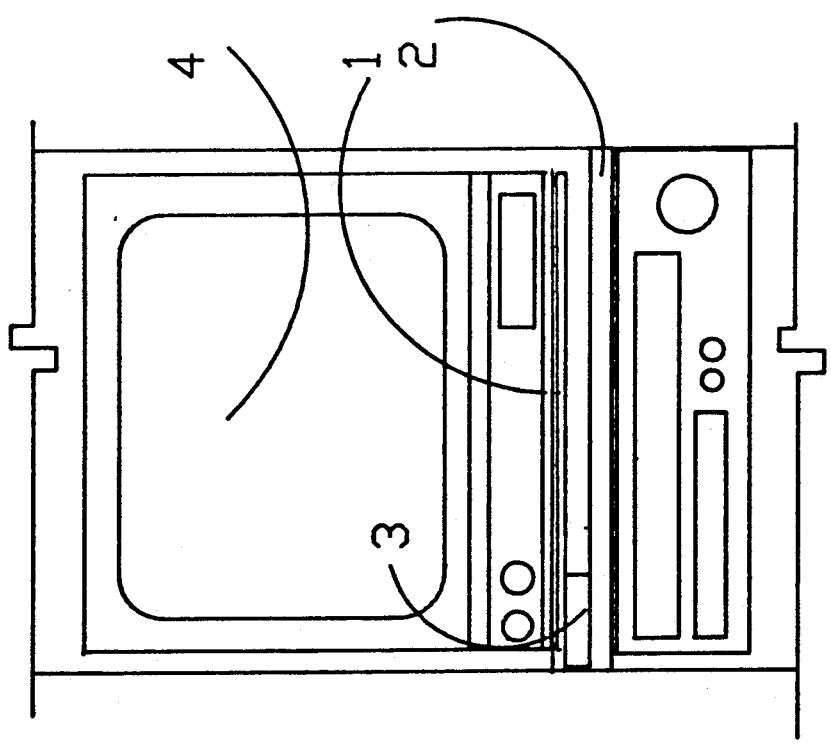
FIGURE 2A
FIGURE 2B

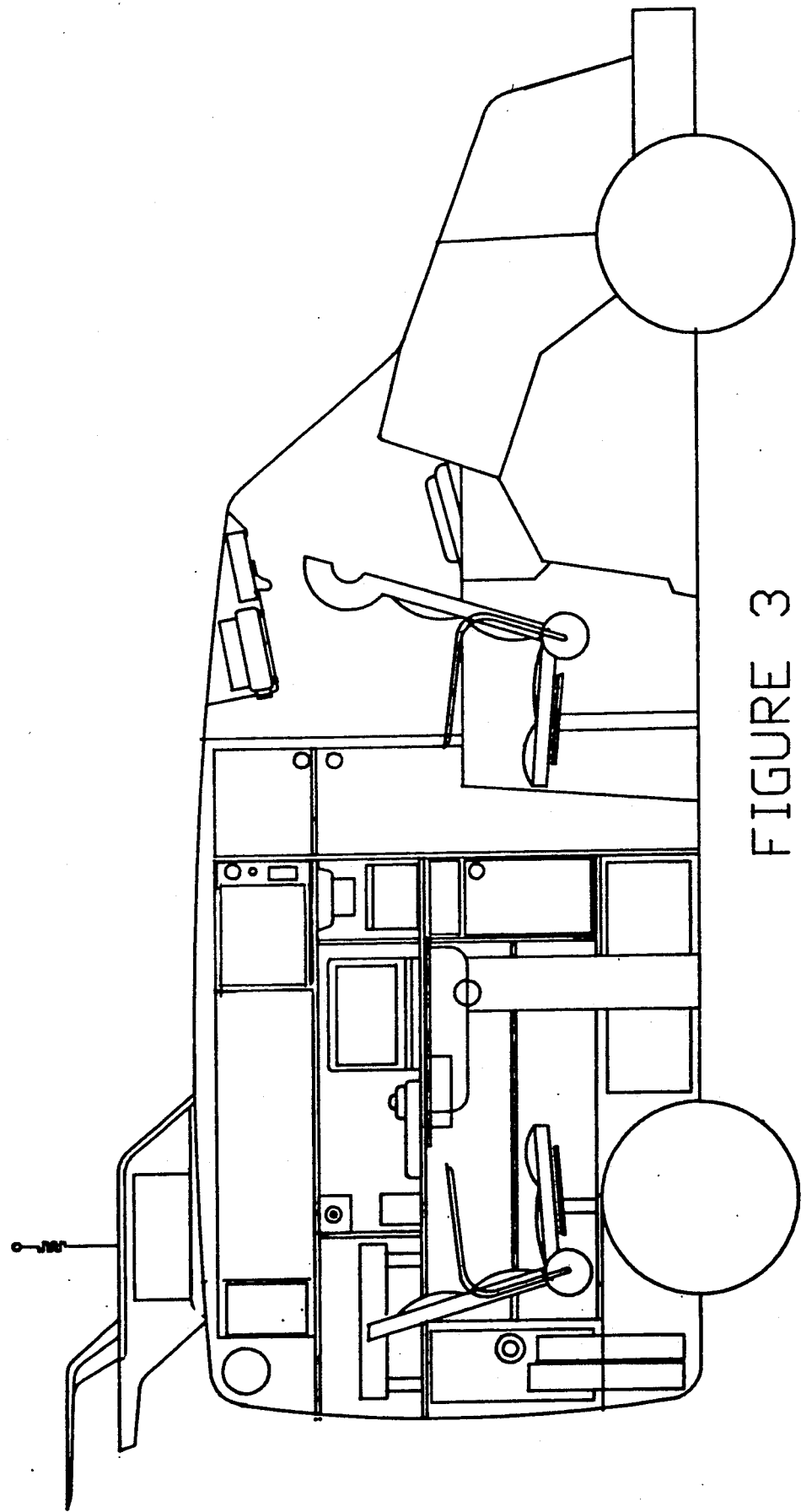

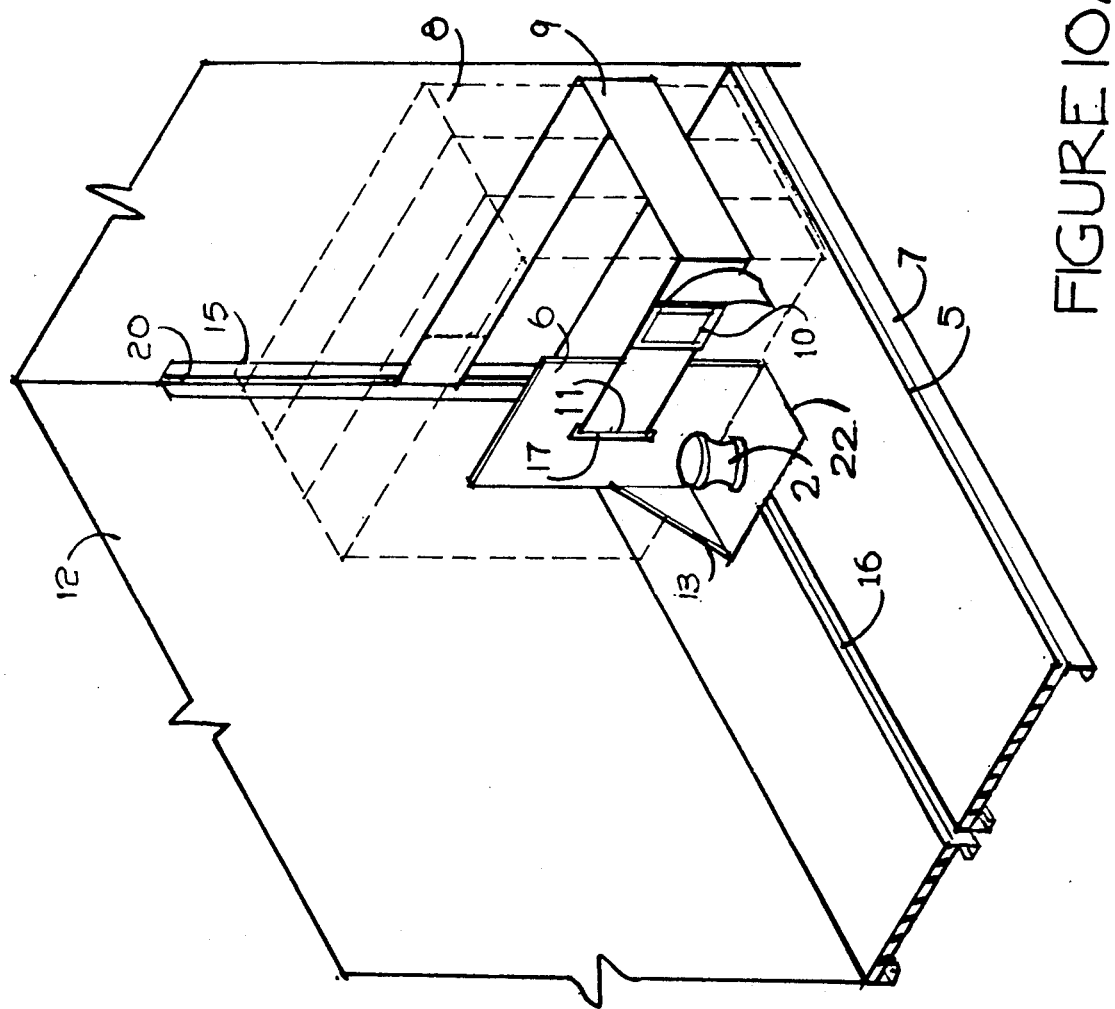

MOTORIZED MOBILE OFFICE

GENERAL DESCRIPTION

Motorized Mobile Office (hereafter called MMO) is a special motor vehicle designed for business persons in need of a mobile office to conduct their business in locations other than a permanent office.

MMO is designed in such a way that any conventional type van vehicle can easily be modified into a MMO. Each MMO can be tailored in a manner, that it will address the particular needs of its users.

Each MMO is equipped with equipment and instruments that greatly enhances and simplifies performing different tasks associated with performing business in a mobile environment.

BACKGROUND OF THE INVENTION

This invention relates to any van type vehicle comprising of an engine, minimum of two side doors, one pivoting or sliding side door, one rear tilt up door as well as driving and navigational instruments.

Although large mobile trailer type offices have been in use for many years, recent increases in office rents, increased mobility of many business people, increased need to do presentations in areas away from main office and need to have a compact and efficient mobile office with modern office and communication equipment in an integrated setting, has created the need for special motor vehicles that provide business persons with all the amenities of regular office space while providing them the advantages of mobility.

The closest invention to MMO (Office trailer, Invented by Mr. A. Williams U.S. Pat. No. 2,677,571 Dated May 4, 1954) had many limitations. For example, there was no engine for the trailer, it needed another vehicle to move it. No modern office equipments and communication systems such as computers, telephones, fax machines and other equipments had been considered. Due to its size it was hard to use for day to day business trips and finally, the spaces and equipments were not planned efficiently.

On the other hand, Motorized Mobile Office (MMO) provides a business person with various means of outside communications such as Telephone, Fax machine, CB radio, Computer Modem, TV Receivers, AM/FM radio, as well as space for small meetings, equipment for different types of presentations, space and equipments for performing various office works, amenities needed for short travel periods, such as space for storage of personal items, facilities for over night sleeping and personal hygiene, as well as other amenities and equipments described in more detail in later sections.

SUMMARY OF INVENTION

The subject of invention is a Motorized Mobile Office having an interior arranged to form a mobile office that takes optimum advantage of the available space to accommodate all the necessities and amenities a business person needs to perform his business tasks in a mobile environment.

Such van type vehicles may be built in various lengths, makes and shapes. The drawings show a prototype of a typical vehicle equipped with equipments described below.

The forward section of the van generally contains two swivel type chairs for driver and a passenger. These chairs can be rotated 180 degrees and be used as seating for various business meetings.

There is an overhead compartment between two front seats which houses a Slide Projector, a CB Radio, an overhead Lights and Tissue Dispenser housing. Under the Overhead Compartment, there is a special console over the engine between two seats here after called FRONT CONSOLE, which houses a Telephone and answering machine, a Map Holder, a Cup Holder, a Note Pad Holder, a Cassette Tape Holder and miscellaneous items holder as well as a special area to place a lap top computer. In addition to the said items there are obviously all the controls and navigational instruments associated with driving a motor vehicle in forward section of the vehicle.

In the middle section of the vehicle there would be a Multi-Functional Unit (here after called MFU) acting as a display area for business literature, Projection Screen, Drafting Desk, Presentation Board Holder and a desk top for performing various office works. Adjacent to MFU on the driver side of the vehicle there is a Specialized Shelving Unit, (here after called Business Activity Center or BAC) this unit which houses most of the equipments and amenities used by the MMO user comprises of the following equipment:

A hi-fi speaker, a book shelf with adjustable book supports, a personal locker, a computer printer and printer stand with specially designed paper holder top lid, an electric pencil sharpener and pencil holder, a telephone and fax machine, a lap-top or portable computer with monitor and keyboard, a specially designed coffee/tea maker, a coat closet, a utility and tool box, a micro-wave oven, a safe, misc. Shelving unit with book supports, and a refrigerator.

Next to the BAC and Behind MFU, in the rear section of the vehicle, there is swivel type executive chair mounted over a track on top of luggage compartment to be used by MMO user. There are additional batteries placed in this compartment for general use when vehicle engine is not running. Over the Executive Chair, there is a specially designed Roll Up Bed to be used for over night sleeping purposes. Behind Executive Chair, there are tubes to hold drawing and blue prints in place. Under the executive chair, there is a luggage compartment of various size depending on the type of vehicle.

Next to the executive chair on passenger side of vehicle, there is another shelving unit (hereafter called Shelving Unit No 3 or SU3) which houses, a TV Monitor /Receiver, a Hi-Fi speaker, a Video Player/Recorder, a special drawer for Video and Audio Cassettes and a base cabinet with lockable doors.

The side panel of Shelving unit No. 3 comprises of a mirror for personal use, an overhead light mounted above mirror, a sliding board mounted on the side tracks underneath the mirror that can be pulled out and be used to rest personal items, an AC/DC plug, two personal items drawers to store personal items such as electric shaver and a base cabinet that contains a water container and a sink.

Over MFU seats, there are Adjustable Task Lights. These light has built in dimmer and can be controlled from the front console. Over the roof of the van, near the rear end, there is a Multifunctional rooftop unit shaped in such a way to act as an aero dynamic wind spoiler as well as providing an excellent place for mounting Television, Radio, Cellular phone, and CB radio antennas for improved reception.

Inside the roof top unit there is a space for extra luggage. On the rear side of the Roof Top Unit, there is a Lockable Sliding Door and Tracks providing stored luggage with security.

BRIEF DESCRIPTION OF DRAWINGS

The subject invention will now be described in greater detail by way of example in the drawings:

FIG. 2 A Front elevation of TV System and its pivoting plate in detail

FIG. 2 B Plan view of TV System and pivoting plate in detail

FIG. 3 is a section cut through the center of vehicle facing driver side of the MMO, showing enlarged view of business activity center (BAC) and its equipments, roll up bed, MFU when it is used as regular desk top, executive chair, luggage compartment and drawing tubes.

FIG. 15 A Section through securing knob connection MFU top surface to the body of the display shelf unit.

DETAILED DESCRIPTION OF THE PREFERRED EMBODIMENT

The subject of invention is a motorized mobile office having an interior arranged to form a mobile office that takes optimum advantage of the available space to accommodate all the necessities and amenities a business person needs in his trips. Such vans may be provided in various lengths, makes and shapes. The drawings illustrate the preferred embodiment of a typical vehicle equipped with equipment described below.

The forward section of the van comprises the following items in addition to all controls and navigational instruments associated with driving a motor vehicle.

Such motor vehicle may be equipped with proper security systems to prevent theft while vehicle is unattended.

Figure 1:
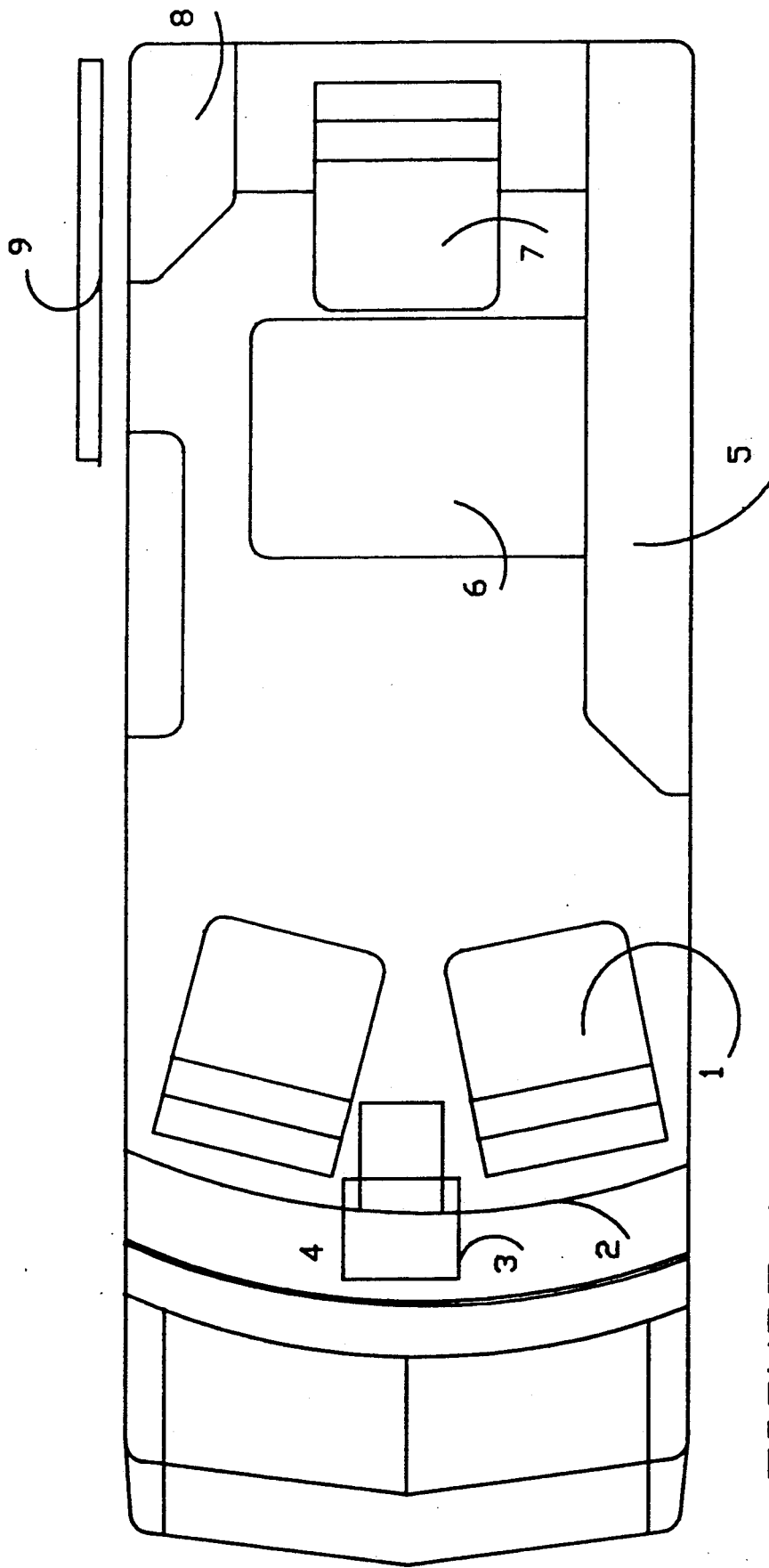
FIG. 1 is a plan view of the entire vehicle in a diagrammatic form showing front seats, multi functional unit (MFU), business activity center (BAC), shelving unit no. 3 (SU3) and executive chair.
Figure 6:
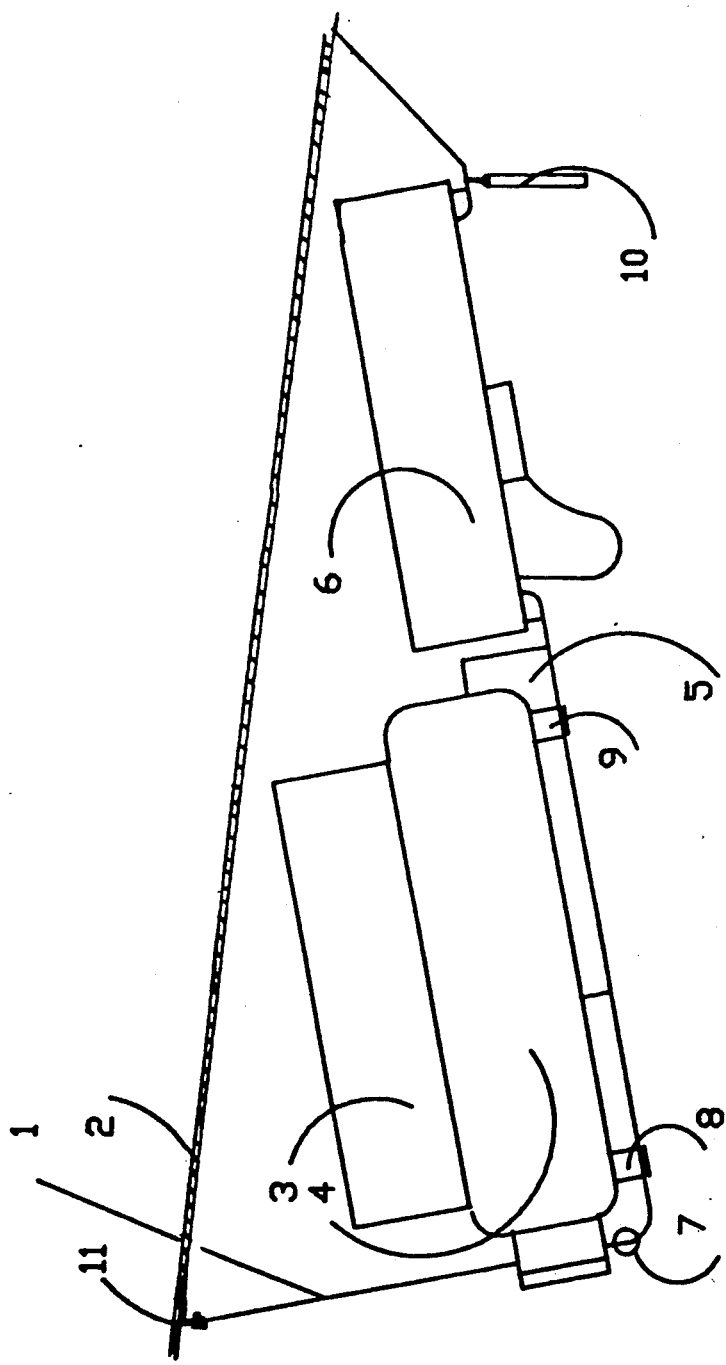
FIG. 6 is a section through Projector/CB radio compartment showing compartment housing, slide projector, and CB radio.

Front seats (FIG. 1 No. 1, FIG. 16, No. 3 and FIG. 17, No. 21) comprising of two swivel type seats with adjustable arm rests. Said seats rotate 180 degrees to face the rear side of the van. They have pneumatic or electronic seat height adjusting mechanism and their backrests be pivoted up to 90 degrees. BC radio/Slide Projector compartment, this compartment mounted between front seats under the ceiling as shown on FIG. 6, this compartment comprises of a Slide Projector and carousel (FIG. 6, Nos. 3,4), a CB radio (FIG. 6, No. 6), a Tissue dispenser housing (FIG. 6, No. 5) Adjustable Task Lights (FIG. 6, No. 10) and housing comprising of a housing bottom panel (FIG. 6, No. 12), two hinges (FIG. 6, No. 7) a front access door (FIG. 6, No. 1) and a locking mechanism (FIG. 6, No. 11). This compartment is mounted to underside of roof (FIG. 6, No. 2) with necessary hardware to keep all the items mentioned above tight in place.

Figure 17:
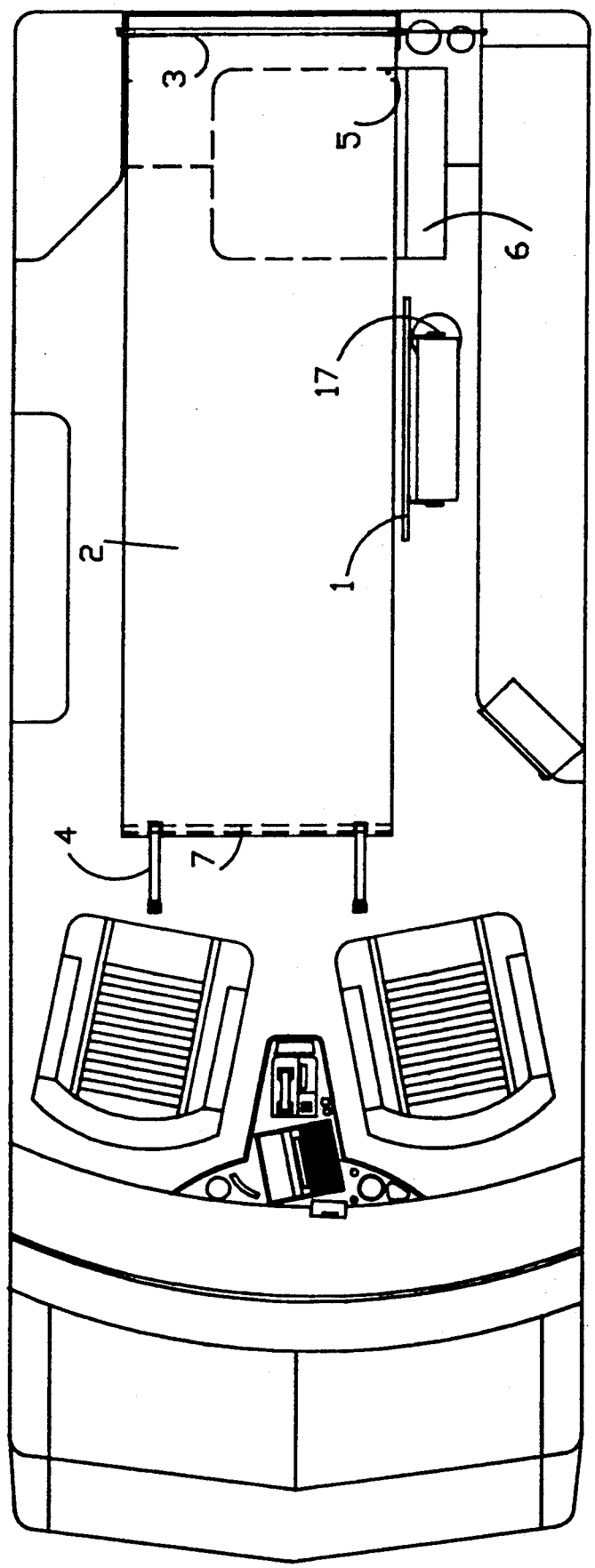
FIG. 17 Horizontal section through the vehicle showing roll-up bed in its extended position.
Figure 21:
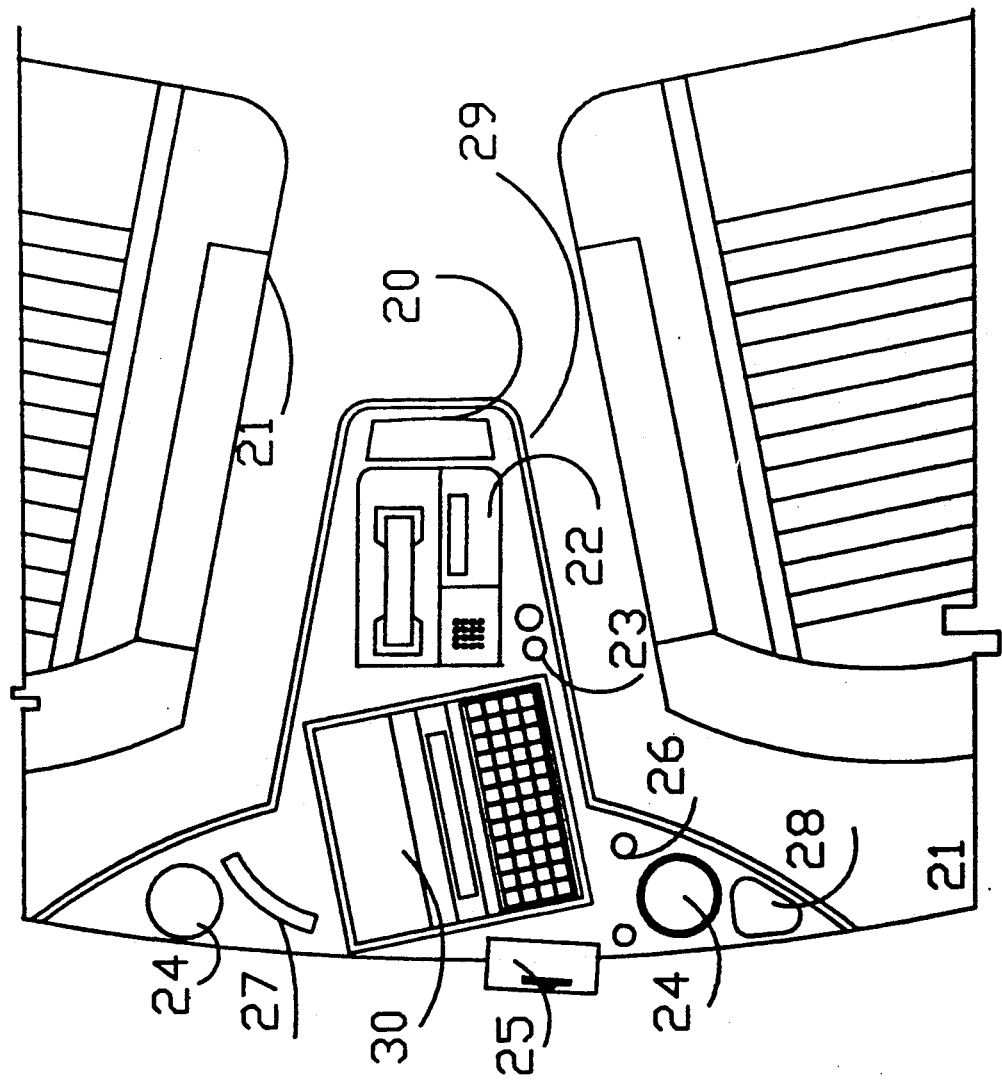

Under said compartment, between front seats, over the vehicle engine compartment, there is front console as illustrated in FIGS. 17 and 21.

This console (FIG. 21, No. 29) consists of a horizontal surface extending outward between two front seat in such way to allow said seats to rotate freely over their support. Said console comprising of the following items, a telephone with answering machine (FIG. 21 No. 22) with possibly multiple communication lines connected to combination fax facsimile and telephone located in (BAC) (FIG. 5. No. 14), a map holder or (FIG. 21, No. 27) electronic navigational system such as travel pilot, two cup holders (FIG. 21, No. 24) located on both end of the front console near the front seats, a note pad and pen holder (FIG. 21, No. 25,) a miscellaneous tray (FIG. 21, No. 28) to store small items such as change money, a cigarette lighter (FIG. 21, No. 26), task lighting control knob for front and rear lights (FIG. 21, No. 23) and an ash tray (FIG. 21, No. 20).

Figure 2:
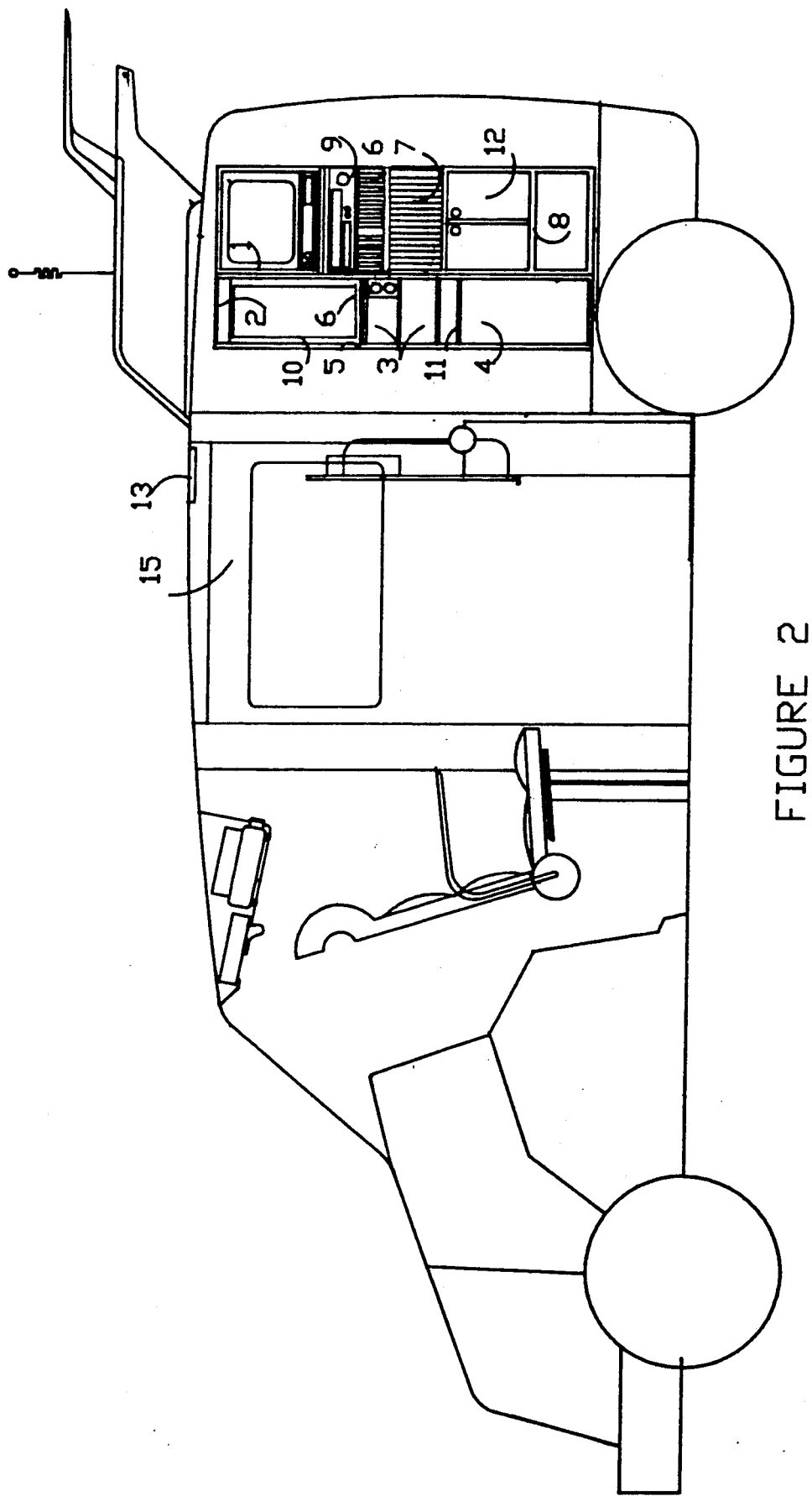
FIG. 2 is a section cut through the center of the vehicle facing passenger side of the vehicle, showing shelving unit no. 3, MFU when it is used as projection screen or presentation board holder, passenger seat slide projection compartment, front console, and the rooftop unit when it is used as seat for business meetings, the executive chair, luggage compartment, CB radio and Slide Projection Compartment, Front Console, and the Roof Top Unit.
Figure 5:
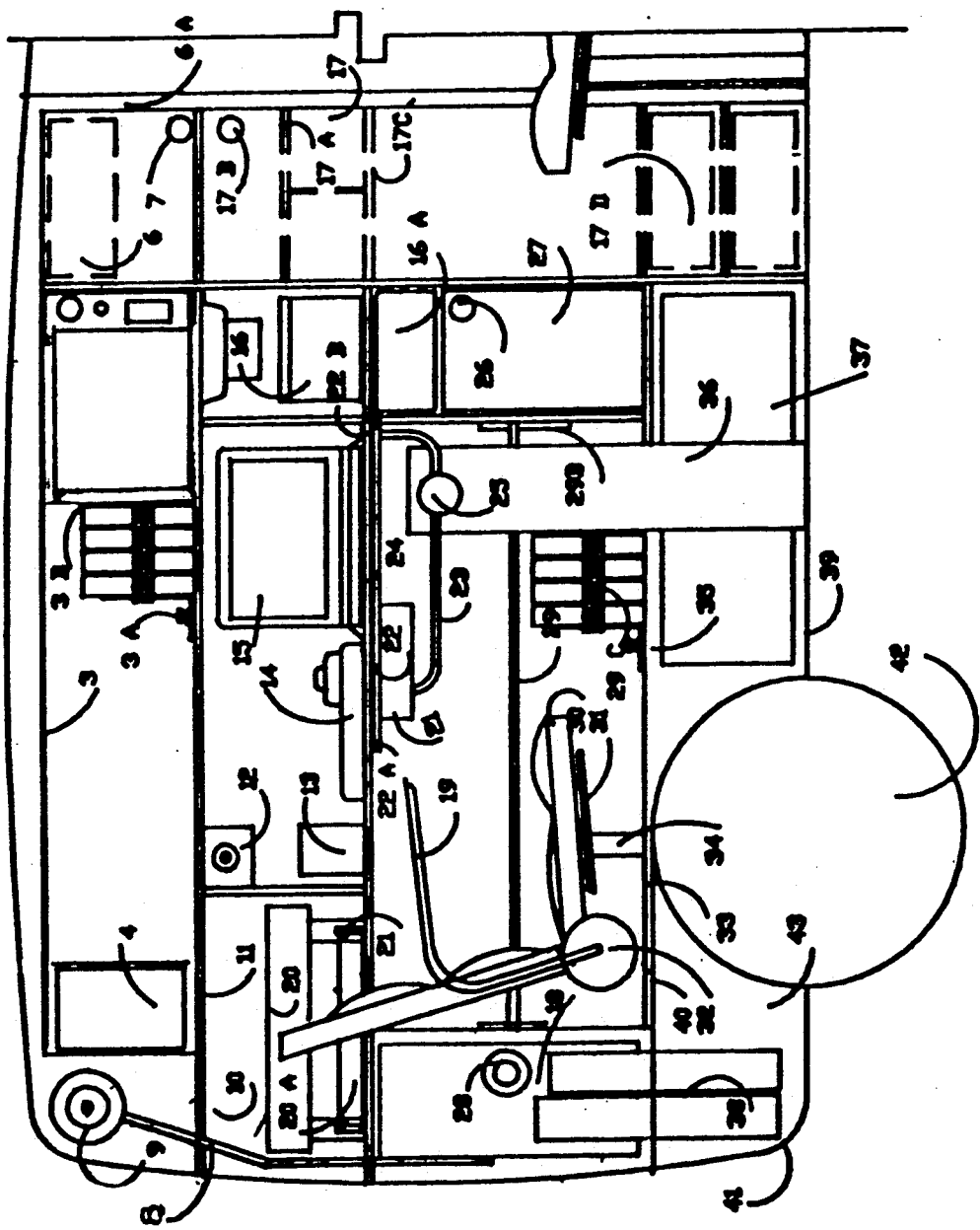
FIG. 5 Detailed diagram of BAC showing various equipments

Business activity center, this self-contained unit which is mounted to the body structure of the vehicle located on the driver side of the van, comprised of several rows of shelving and various equipments. Starting from top left hand side of this unit as shown in FIG. 5, these equipment comprises of:

A HI-FI Speaker (FIG. 5, No. 4) made to required size and mounted to the side and the back of shelving unit, this speaker and its counterpart in opposite side (FIG. 2, No. 16), are connected to the central sound amplifier of the van. Said amplifier (FIG. 2, No. 17) in turn is connected to the radio, TV monitor/receiver video recorder/player (FIG. 2, No. 1), Am/Fm radio/cassette deck and compact disk player (FIG. 2, No. 9).

Figure 10:
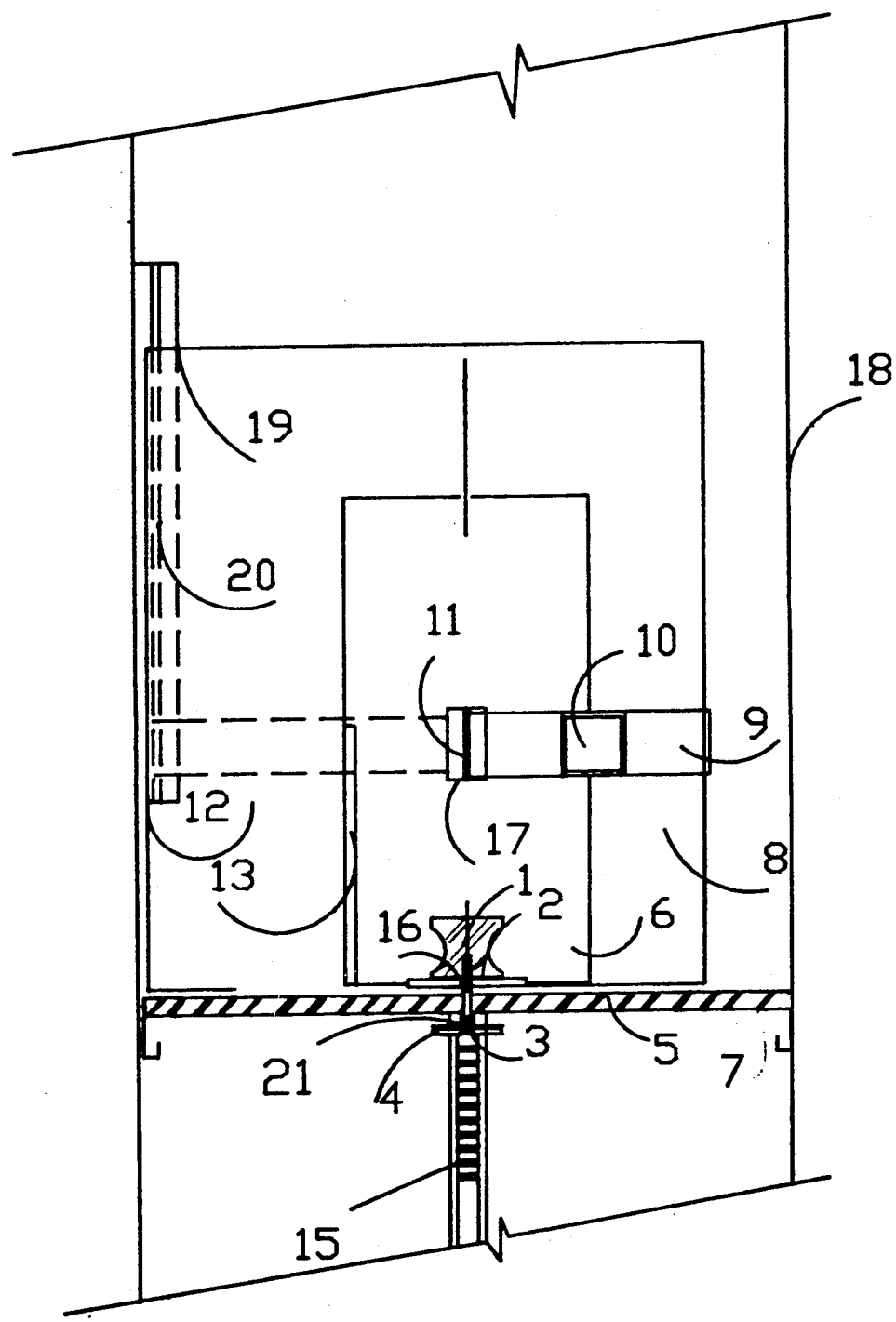
FIG. 10 Section through book shelf showing book supports, holding straps and strap buckle, securing knobs, standards and slip resistant mat.

Book shelf No. 1 with adjustable book supports (FIG. 5, No. 3), this book shelf which houses reference material, books and other printed materials (hereafter referring to them as books), comprises of a shelving unit with adjustable book supports which are slidably mounted to a continuous track as illustrated in FIG. 10, No. 16 located on the center of horizontal shelving panel (FIG. 10, No. 7). Said shelving unit as illustrated in FIG. 10 comprises of the following components:

A horizontal shelving panel made from a light weight metal with enough strength to carry the load of the books (FIG. 10 and FIG. 10A, No. 7). This panel can be adjusted to various heights with the use of standards (FIG. 10, No. 15) mounted to the vertical side panels of the shelving unit (FIG. 10 and FIG. 10A, No. 18). The entire top surface of the horizontal shelving panel is covered with a mat (FIG. 10 and FIG. 10A, No. 5) made of slip resistant materials such as rubber to prevent books from moving and making squeaking noise while vehicle is in motion. On the center of the horizontal shelving unit, there is a continuous slot to form a track (FIG. 10 and FIG. 10A, No. 16) where a specially designed book support (FIG. 10 and FIG. 10A, No. 6) can slide and be secured. This book support comprised of a securing knob (FIG. 10, No. 1) which is connected to a long screw (FIG. 10, No. 3) extending to the bottom end of the horizontal shelving panel. There is a washer (FIG. 10, No. 4) in bottom end of said screw large enough to prevent the screw from sliding through the track while providing enough friction to hold the book support in place when vehicle in motion. Underneath the securing knob, there is another washer (FIG. 10, No. 2) providing enough friction between said mat (FIG. 10, No. 5) and securing knob (FIG. 10, No. 1). By tightening securing knob (FIG. 10, No. 1), the long screw is moved upward providing enough friction between said washers and the top mat and side edges of the horizontal shelving track FIG. 10, No. 21 preventing the book support from moving along the track. The body of book support (FIG. 10 and FIG. 10A, No. 6) is comprised of a light weight metal forming a special shape as illustrated in FIG. 10, No. 6. On the vertical panel of said book support, there is a rectangular opening (FIG. 10, No. 11). On the center of this opening there is a rod (FIG. 10, No. 17) attached to top and bottom of the said opening. A book holding strap (FIG. 10, and FIG. 10A, No. 9) is mounted around this rod. Additional support against torsion and bending of the said book support is provided by a metal panel (FIG. 10 and FIG. 10A, No. 13) installed to the side of the book support facing vertical panel of the shelving unit (FIG. 10, No. 12) connecting vertical panel (FIGS. 10 and 10A, No. 6) and horizontal panel (FIGS. 10, and 10A, No. 22) of the book support together. On the center of the horizontal panel of said book support, there is a hole large enough to provide linkage between securing knob and long screw.

The vertical panels of the shelving unit (FIG. 10, No. 12,18) have an opening (FIG. 10, No. 19) at their corner as tall as the side panel standard FIG. 10, No. 15. In Center of this opening, there is a vertical rod (FIG. 10, No. 20) mounted to the corner of vertical shelving panels (FIG. 10, No. 12 and 18). One end of the book holding strap (FIG. 10A, No. 23) is secured around this rod. Said strap (FIG. 10 and FIG. 10A, No. 9) wraps round books (FIG. 10 and FIG. 10A, No. 8), entering to the opening in the center of the book support (FIG. 10, No. 11) and passing through to a buckle (FIG. 10, No. 10) installed over the strap located close to the book support. To secure books from falling, books are placed between the side vertical panel of the shelving unit (FIG. 10, No. 18) and book support (FIG. 10, No. 6). Book support is secured in place by tightening the securing knob (FIG. 10, No. 1) against the side of the books. Holding strap (FIG. 10, No. 9) is stretched and tightened using said buckle.

Micro wave oven (FIG. 5, No. 3B), this micro wave oven is adapted for use in vehicle and is mounted to horizontal and rear vertical shelving panel.

Personal locker with combination lock, FIG. 5, No. 6 & 7), this locker can be equipped with a combination lock (FIG. 5, No. 7). There is an interior drawer (FIG. 5, No. 6) being used to store valuables of the MMO user.

Figure 8:
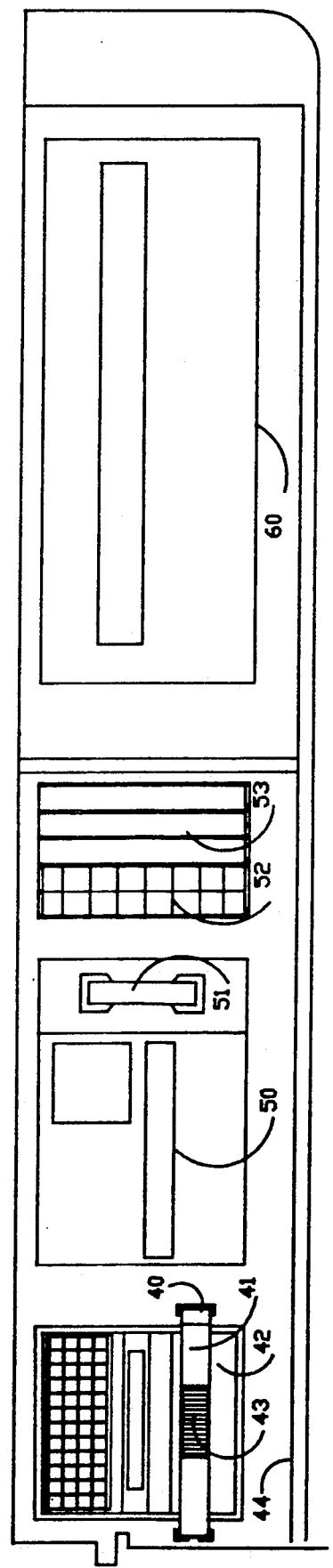
FIG. 8 is a horizontal section through BAC showing arrangement of various equipment mounted over the horizontal shelving panel
Figure 11:
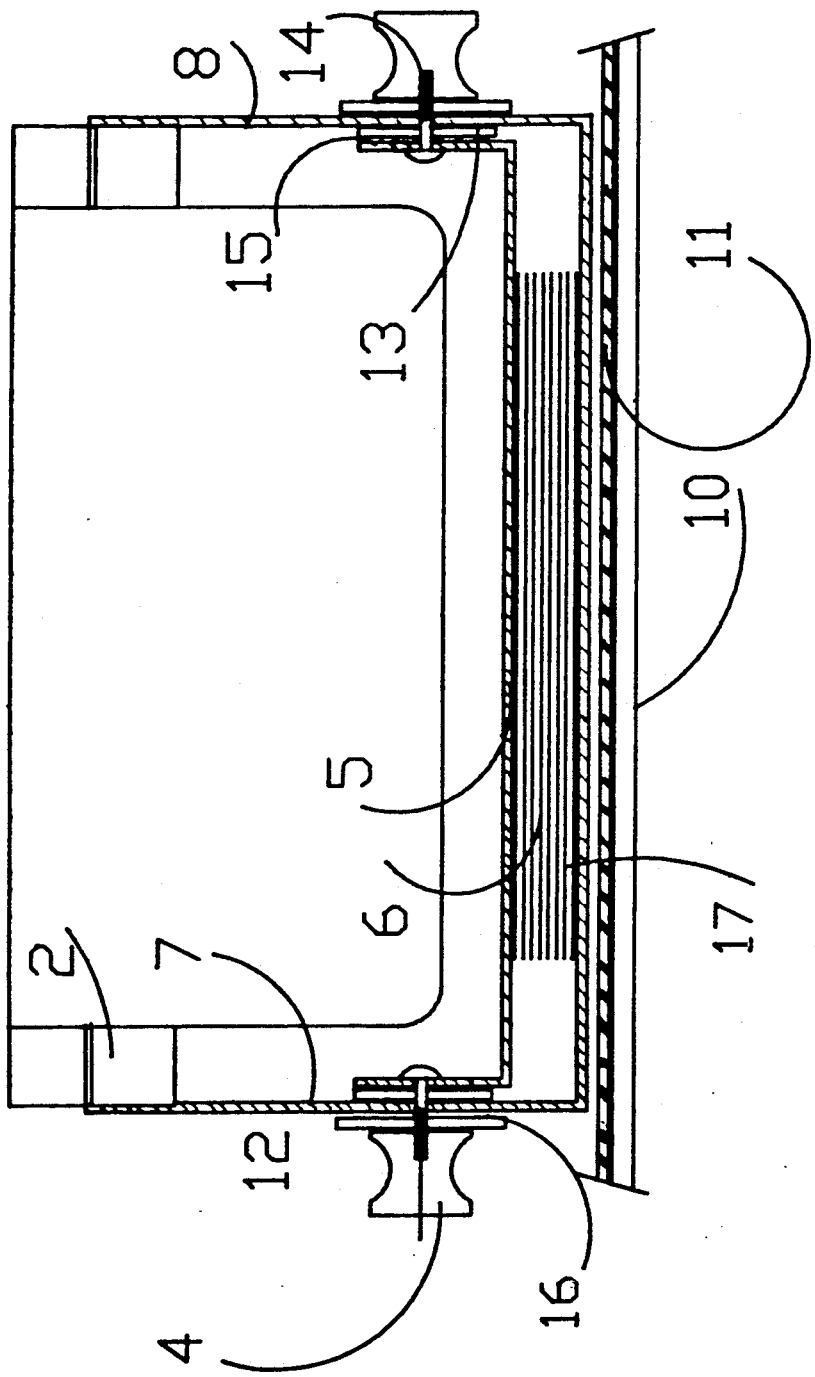
FIGS. 11 and 12 Section through printer stand/paper tray unit, showing printer, paper tray housing, top lid, securing knobs and attachment straps FIG. 13 Section through MFU when its top surface is in its vertical position, showing interior display shelf, rotating plates, standards and their related components.
Figure 11A:
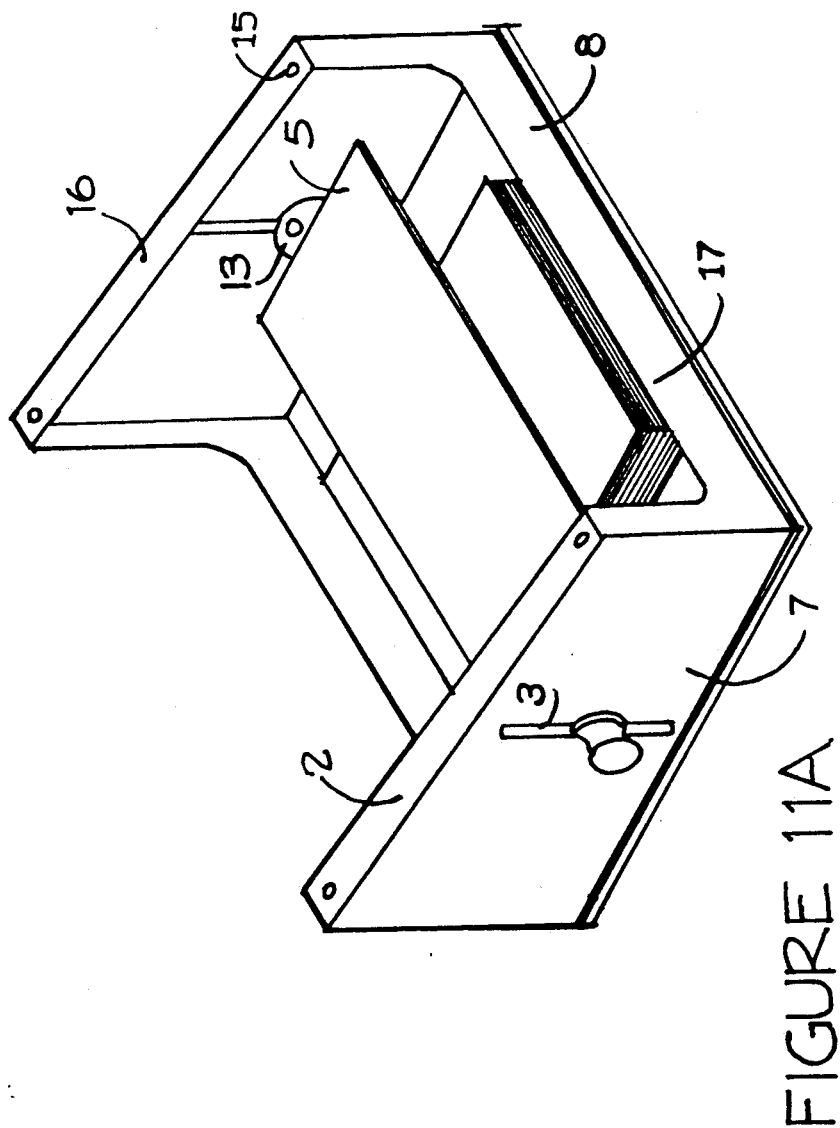
Figure 12:
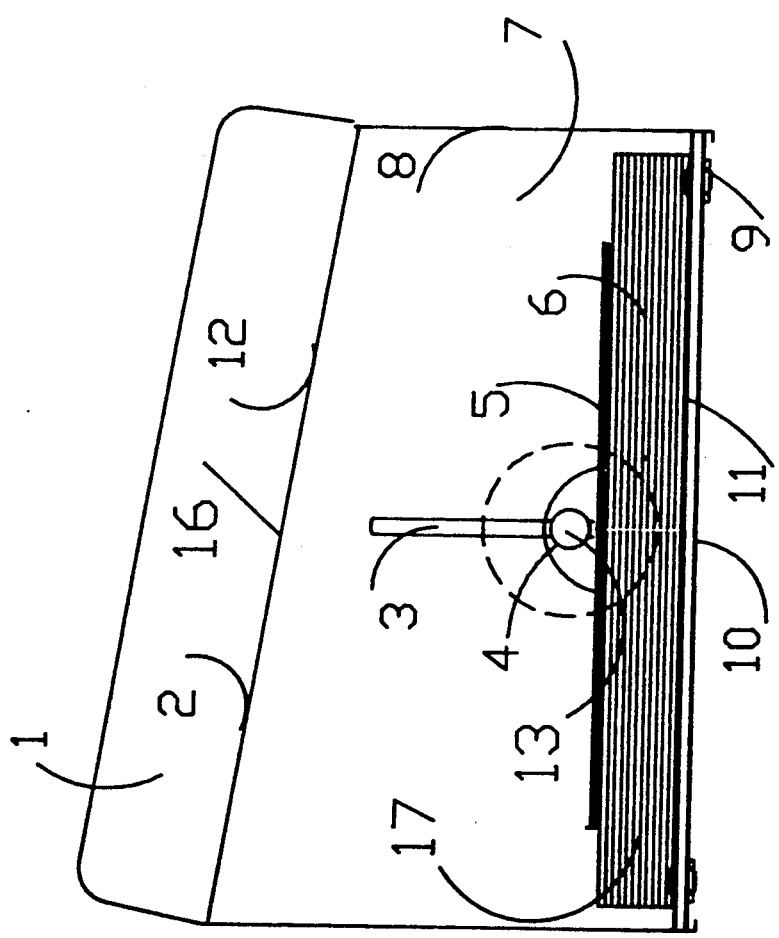

Computer printer and printer stand (FIG. 5, No. 20, 20A, FIG. 11 and FIG. 12), computer printer is mounted over a specially designed paper tray/printer stand described below. Said printer (FIG. 5, No. 20, FIG. 8, No. 60 and FIG. 12, No. 1) is connected to a computer (FIG. 5, No. 15, and to a portable fax facsimile machine and telephone combination (FIG. 5, No. 14 and FIG. 8, No. 50). The paper tray/printer stand as illustrated in detail in FIGS. 11 and 12 comprises of the following components: This specially designed printer stand/computer paper tray here after called PS/PT, is designed in such a way to provide a proper and secure stand for various types of printers while providing computer paper with a secure place when vehicle is in motion. The body of PS/PT comprised of four sides as illustrated in FIGS. 11, 11A and 12. This body is made of a light weight metal strong enough to hold the load of the printer and paper. The front and rear side panels (FIGS. 11-A and 12, No. 8) of the PS/PT is substantially open to reduce the weight of PS/PT while providing a large enough opening for placement of paper inside the tray. The side panels (FIGS. 11A, 11 and 12, No. 7) with its top sloping at an angle provides support for the printer. The top side is sloped to facilitate working with the printer while the user is seated. There is a rectangular metal strip (FIGS. 11, 11a and 12, No. 2) attached to the to top side of both side panels (FIG. 11A No. 7). There is a continuous attachment fabric strip such as velcro (FIG. 11A and FIG. 12 No. 16) mounted to said metal strip. This attachment fabric strip with its counterpart attached to the bottom of the printer, provides the means for securing various types of printers to the top of the PT/PS. If the user desires to install said printer permanently over the PT/PS, there are two slots provided at each end of the metal strip (FIG. 11-a, No. 15). These slots can be used to secure the printer with suitable screws and bolts. There is an adjustable top lid (FIGS. 11, 11a, 12, No. 5) that can move along the slot in center of said side panels (FIGS. 11-a and 12, No. 3). This top lid when is secured in place over the papers, prevents papers from moving when vehicle is in motion. The top lid comprised of two side panels (FIGS. 11, 11a, 12, No. 13) with a central hole. There is securing knob similar to the securing knob (FIG. 11 No. 4) used in book support that is connected to a long screw (FIG. 11, No. 14). There are two rubber type washers (FIG. 11, No. 15) on either side of the PS/PT side panels. Before driving the vehicle, the user can adjust the top lid to the top of the paper (FIGS. 11, 11A and 12, No. 17) and tighten the securing knobs. By doing this, papers are secured in place and prevented from moving when vehicle is in motion.

Electric pencil sharpener and pencil holder (FIG. 5, No. 12 & 13). This electric pencil sharpener (FIG. 5, No. 12) is mounted to shelving system from its top to the bottom of the horizontal panel (FIG. 5, No. 11) of the shelving unit. Underneath the pencil sharpener, there is pencil and paper holder made out of a synthetic material (FIG. 5, No. 13 and FIG. 8, No. 52, 53) mounted from its bottom to the top of the horizontal panel of the shelving unit (FIG. 5, No. 11). This specially designed unit has honeycomb pen housing with soft interior to prevent noise created by pens hitting against the interior wall of the housing (FIG. 8, No. 52).

Telephone/fax facsimile machine (FIG. 5, No. 14, and FIG. 8, No. 50, 51). This specially designed Fax machine (FIG. 5, No. 14) is mounted from its bottom to the top of the horizontal shelving panel (FIG. 5, No. 44). Said Fax machine is connected to the printer (FIG. 5, No. 20) and the telephone (FIG. 21, No. 22) located in the front console of the vehicle.

Portable or lap top computer, monitor and keyboard (FIG. 5, No. 15 and FIG. 8, No. 42) Said lap-type or portable computer is secured in place with two pieces of attachment fabric strips such as velcro (FIG. 8, No. 43) attached to the top of special type of holding straps (FIG. 8, No. 41). One end each strap (FIG. 8, No. 40) is secured to the top of the horizontal shelving panel (FIG. 8, No. 61). To secure the computer in place, It is placed between each end of the straps and straps are connected to each other securely over the top of the computer as illustrated in FIG. 8. These straps prevent computer from moving while vehicle is in motion.

Computer can be removed from its location by opening the holding straps. This computer can be connected to printer (FIG. 5, No. 20), telephone line and fax machine (FIG. 5, 14). The entire top surface of the horizontal shelving panel (FIG. 8, No. 61) supporting these equipment is covered with a rubber type mat similar to the mat used in upper shelf (FIG. 10, No. 5) to prevent sliding and squeaking noise created by movement of equipment against the horizontal shelving panel while vehicle is in motion.

Figure 9:
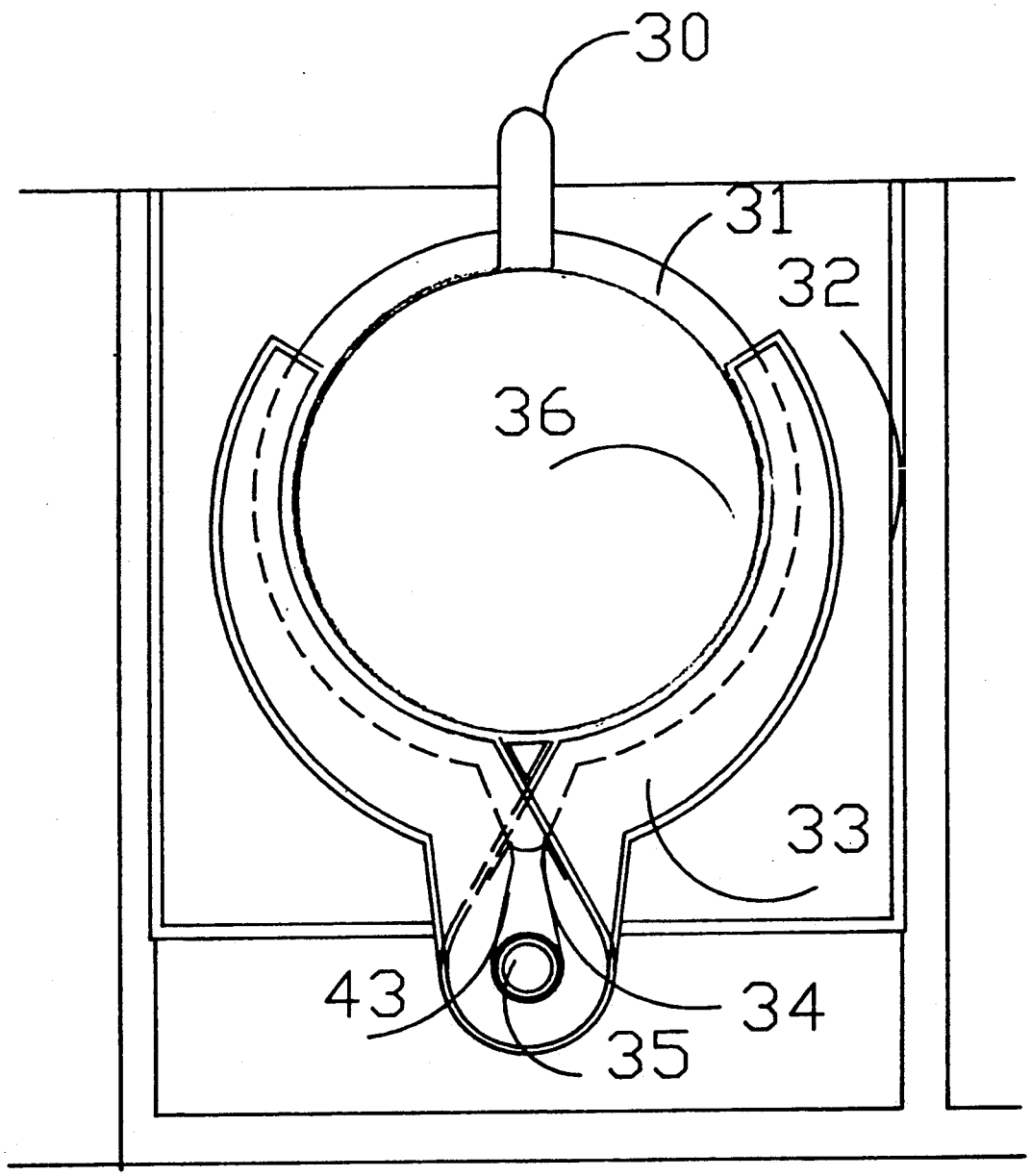
FIG. 9 is a horizontal section through coffee maker machine showing its special arms keeping coffee pot in place.

Coffee maker (FIG. 5 No. 16) This coffee/tea maker is adapted for use in a mobile vehicle in such way to prevent spilling coffee while the vehicle is in motion. A coffee pot (FIG. 5, No. 16 a and FIG. 9, No. 31) Has a top-lid with rubber ream. Said top-lid prevents spilling coffee when vehicle is in motion. Said coffee pot (FIG. 9, No. 31) has a handle (FIG. 9, No. 30). To secure said coffee pot in place, there are two curved shaped arms made to size of the coffee pot (FIG. 8, No. 33). Said arms can rotate along a central rod (FIG. 9, No. 35) and the interior surface of the arms is covered with a rubber type of material (FIG. 9, No. 35) creating a better grip between the surface of the coffee pot and the arm while preventing noise created by hitting coffee pot surface against the arms. Said rod has two springs (FIG. 9, No. 43) connected to one end of curved arm (FIG. 9 No. 33). Said springs push outer end of said arm toward each other. To secure said coffee pot, Said arms are pulled away, the coffee pot is placed between said arms, and arms are released. Spring loaded arms keep coffee pot firm in place when vehicle is in motion. Under the coffee maker unit, there is a compartmentalized drawer (FIG. 5, No. 16A) to store cups, spoons, coffee, sugar and other miscellaneous items secure in place while vehicle is in motion.

Coat closet (FIG. 5, No. 17), this coat closet comprising of a coat rod (FIG. 5 No. 17a), adjustable holding straps (FIG. 5, No. 17c) and drawers (FIG. 5, No. 17d) is used for carrying suits and other personal cloths. Straps (FIG. 5 No. 17C) are used to keep cloths hung from coat rod in place while vehicle is in motion.

Safe (FIG. 5 No. 18,28) This fire proof, vandal resistant safe (FIG. 5, No. 18) with its combination lock (FIG. 5, No. 28) is used to store valuables. It is securely mounted to the vertical sides of the shelving units and the welded to the to the body of the vehicle.

Shelving unit No. 2 (FIG. 5, No. 29) this multipurpose shelving unit with its horizontal shelving panels (FIG. 5, No. 29) book supports, and holding straps (FIG. 5, No. 29c) is similar to shelving panel described above and illustrated in FIG. 10. These adjustable shelving panels is used for whatever uses the user of MMO deems suitable. The shelving panel height can be adjusted vertically with the use of the standards (FIG. 5, No. 29B) provided on the side walls of the shelving unit. Each shelving panel has a bottom track and various number of book supports and straps similar to the those used on book shelf No. 1 (Refer to FIG. 10 for details)

Refrigerator (FIG. 5 No. 27) The refrigerator (FIG. 5, No. 27) is used for storing liquids and food. It is tightly compartmentalized to prevent bottles from moving while vehicle is in motion.

Drawing and blue print tubes (FIG. 5, No. 38) These tubes with various heights and diameters can be used to store rolled drawing. They extend to bottom of the Luggage Compartment.

Utility and tool box (FIG. 5, No. 37) This utility and tool box (FIG. 5, No. 37) used for storing miscellaneous tools and equipment.

Figure 16:
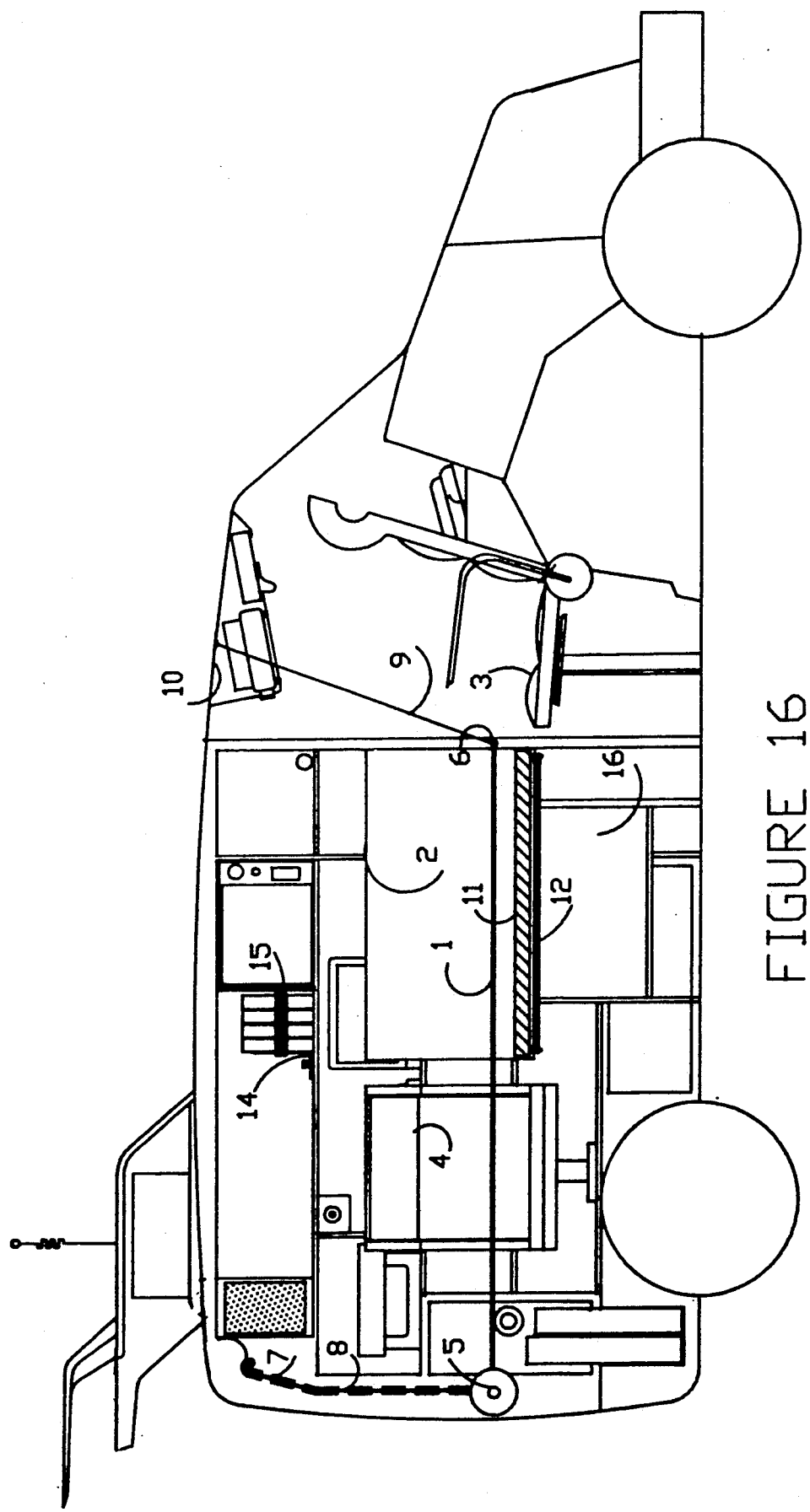
FIG. 16 Section through vehicle showing the roll-up bed when it is used. In this section the executive chair and MFU is rotated 90 degrees, tubular support is lowered to its low position and the front end of the bed canvas is hooked to the ceiling of the van via bed holding straps.

Mounted to the rear side of the vehicle at the top corners, there is a specially designed bed (FIG. 5, No. 9), (FIG. 16, No. 5,1), (FIG. 17, No. 2) which is used for sleeping and resting by the MMO user. This roll-up bed (FIG. 16, No. 1) comprises of two vertically oriented tracks (FIG. 16, No. 8) generally parallel to rear side of the van, a fabric mattress (FIG. 17, No. 2 and FIG. 16, No. 1) strong enough to hold the weight of two persons, a rotating central supporting pipe (hereafter called RCSP) (FIG. 20, No. 6), ceiling hooks (FIG. 16, No. 10 and FIG. 18, No. 3) and tightening straps (FIG. 16, No. 9 and FIG. 17, No. 4).

Figure 20:
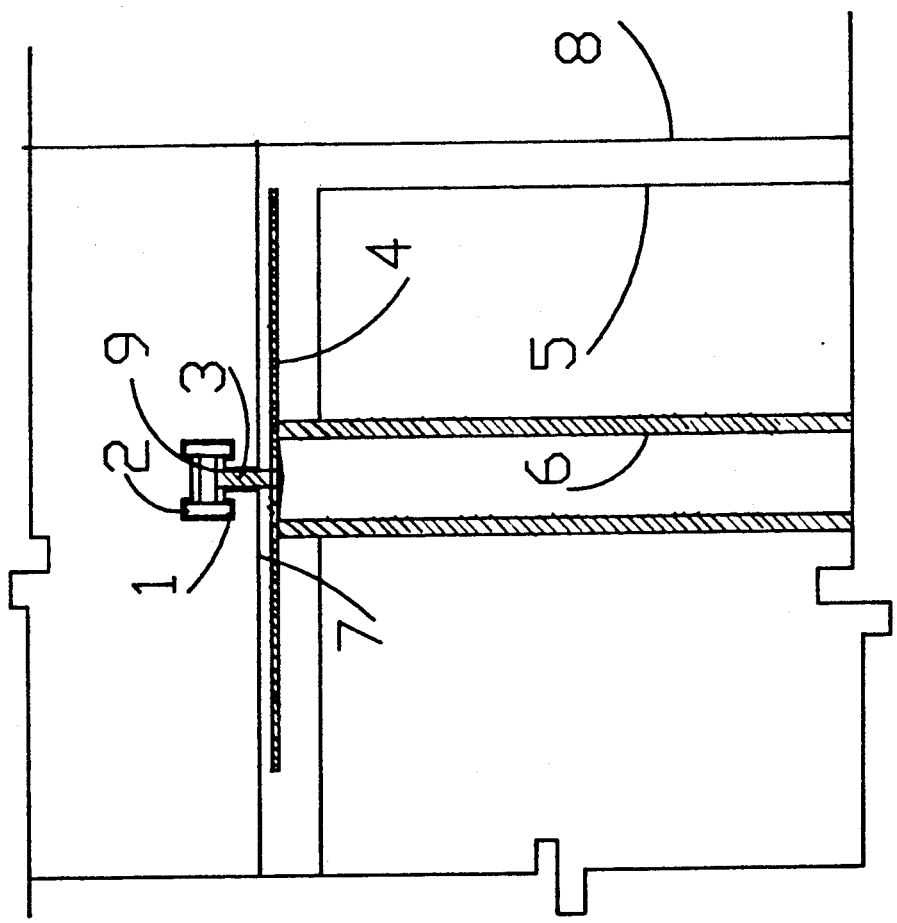
FIG. 20 Section through roll-up bed track and the tubular support showing bed canvas, tubular support, roll guards and bed rolling device FIG. 21 Horizontal section through front console showing various components of front console.

Rotating central supporting pipe is made of a light weight metal strong enough to hold the weight two persons (FIG. 20, No. 6). This pipe is welded to two mattress guards shaped as a circular plate (FIG. 20, No. 4 and FIG. 16, No. 5) in each ends. These circular plates are used as guard for the mattress fabric (FIG. 16, No. 1 and FIG. 20, No. 5) when they are rolled around RCSP. They also help the orderly roll without any wrinkles of the fabric mattress. These mattress guards are attached to a short rod (FIG. 20, No. 3) extending inside the bed tracks (FIG. 20, No. 1 and FIG. 16 No. 8) in either side of the van. There is another rod functioning as an arm (FIG. 20, No. 9) welded at its mid point to the extending rod (FIG. 20, 3). There are two rolling devices such as ball-bearings (FIG. 20, No. 2) attached to the end of said arm moving along the bed tracks (FIG. 16. No. 8, and FIG. 20, No. 1). These rolling devices facilitate movement of the RCSP along the track. At the top end of said tracks there is a resting place (FIG. 16, No. 13) where attached rolling devices are positioned when bed is not in use. This resting place is a small inverted U-Shaped curve at the end of the track as large as a rolling device (FIG. 17, No. 7). When the rolling device is positioned in this area, the weight of the bed assembly prevents the bed from jumping back to track when the vehicle is in motion.

Figure 18:
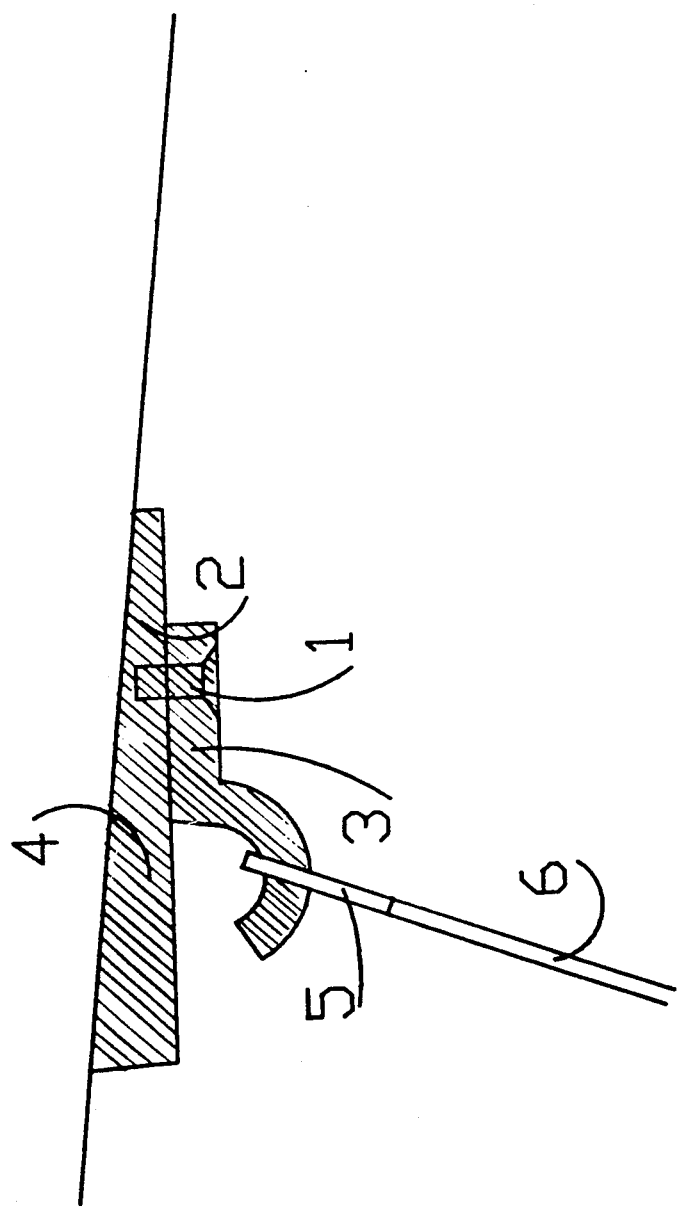
FIG. 18 Section through roll-up bed ceiling attachment apparatus, showing bed holding straps when it is attached to the vehicle's ceiling hooks.
Figure 19:
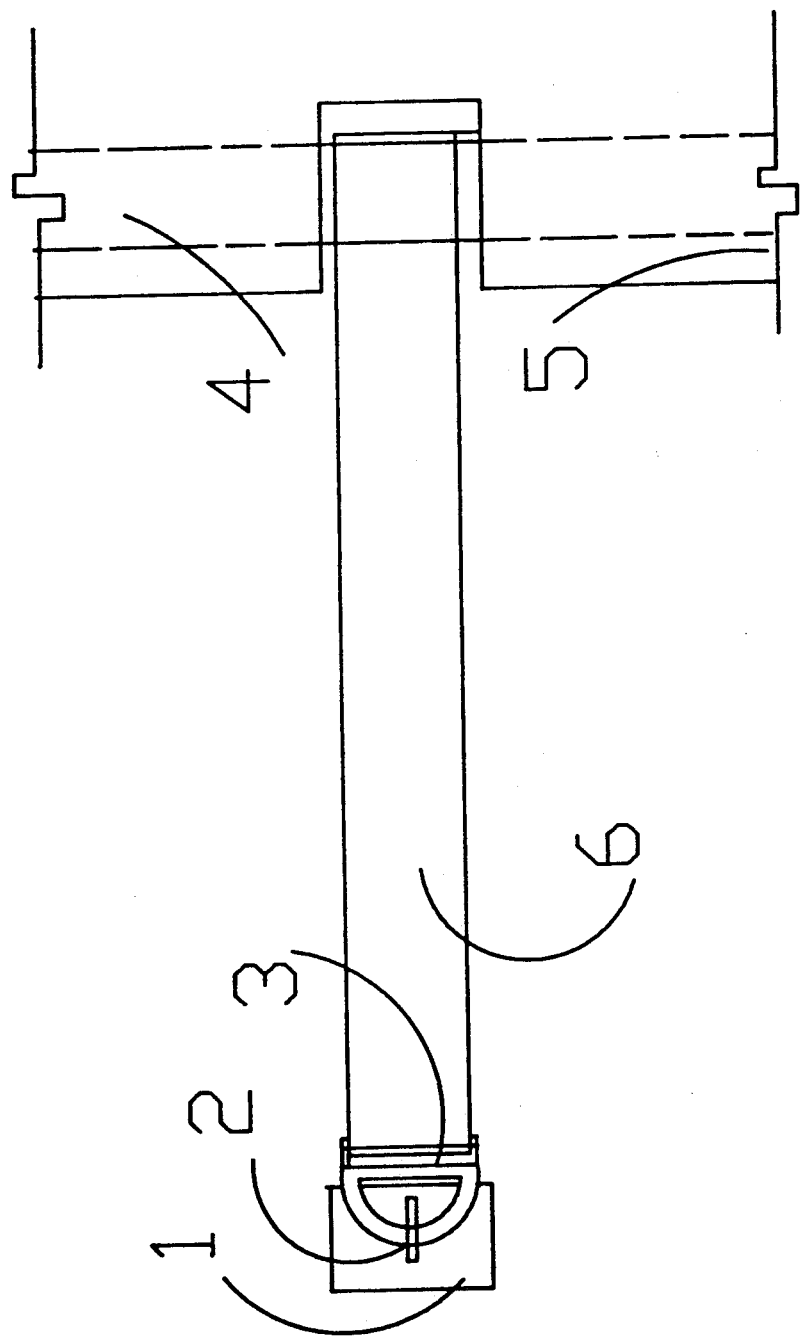
FIG. 19 Horizontal section through roll-up bed ceiling attachment apparatus showing bed holding straps and ceiling hooks.

The bed mattress (FIG. 17, No. 2) is made of a fabric strong enough to hold the weight of two persons, is continuously attached to the bed RCSP at one end and to another light weight end rod at other end (FIG. 17, No. 7). There are two holding straps (FIG. 19, No. 6 and FIG. 17, No. 4) attached to said rod. When said bed is extended, said straps are hooked to ceiling hooks as shown in FIG. 18. These specially designed ceiling hooks (FIG. 18) comprises of following parts: There is a mounting plate (FIG. 18, No. 4) mounted to the ceiling of the van. There is a metal hook (FIG. 18, No. 3) mounted to said mounting plate via screws (FIG. 18, No. 1). Holding straps (FIG. 18, No. 6) are attached to said hooks via their metal rings (FIG. 18, No. 5 and FIG. 19, No. 3). To use said roll-up bed, executive chair (FIG. 16, No. 4) and MFU (FIG. 16, No. 16) is rotated 90 degrees, front seats (FIG. 16, No. 3) are rotated 180 degrees, roll-up bed (FIG. 16, No. 5) is lowered along the side tracks, its fabric mattress is extended to its full length (FIG. 16, No. 1) and its holding straps (FIG. 16, No. 9) are attached to ceiling hooks (FIG. 16, No. 10).

To store the bed after use, its holding straps are unhooked from ceiling hooks, its fabric mattress is rolled around RCSP, and holding straps are rolled around the bed mattress and secured in place with buckles (FIG. 19, No. 6) mounted on the end rod. The bed is pushed upward along the side tracks to the highest point and positioned at track resting place (FIG. 16a No. 13).

Executive chair (FIG. 16, No. 4 and FIG. 17, No. 17) This chair is similar in construction to front seats (FIG. 17, No. 6) except for the following differences. The executive chair is mounted over the luggage compartment (FIG. 5, No. 43) having a shorter leg (FIG. 5, No. 34). The executive chair pivots 90 degree in either directions (FIG. 1, No. 7 and FIG. 17, No. 5) to facilitate the movement of the MMO user as well as providing space for extending the roll-up bed (FIG. 16, No. 1). It can slide along the track (FIG. 5, No. 33) mounted over the luggage compartment.

The arm rests (FIG. 5, No. 19) can be lowered to comfortable height for the MMO user.

Multi functional desk/drafting board/projection screen/presentation board support and display shelving (MFU)

Figure 4:
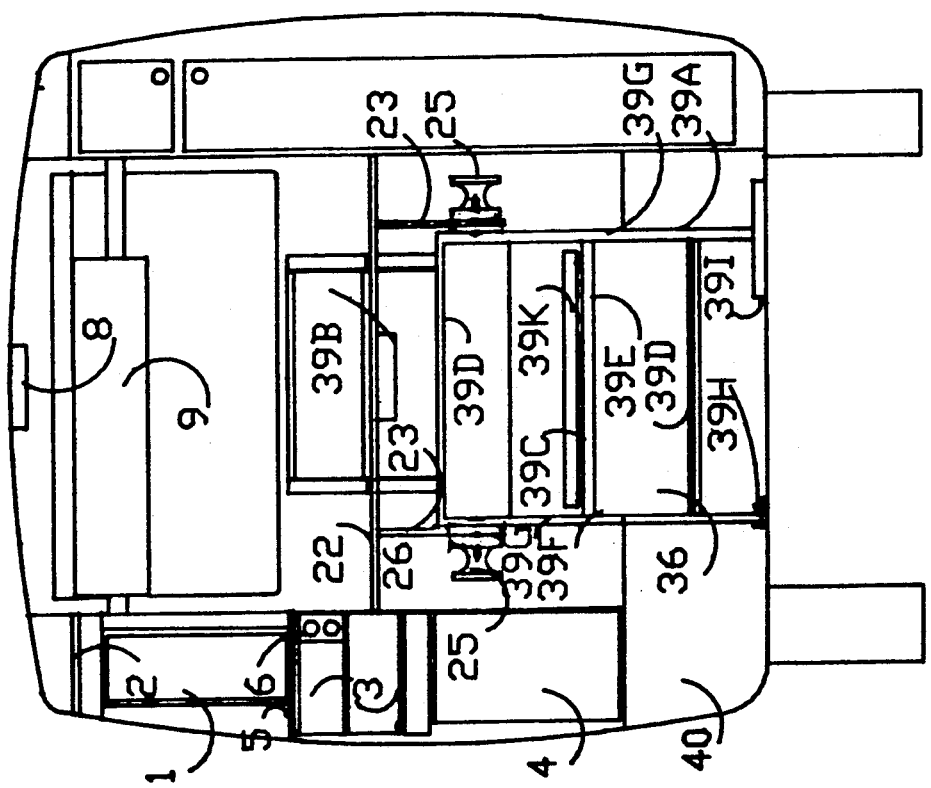
FIG. 4 is a section cut through the center of the van showing roll-up bed, MFU front view when it is used as desk top, and side views of SU3 and BAC.
Figure 13:
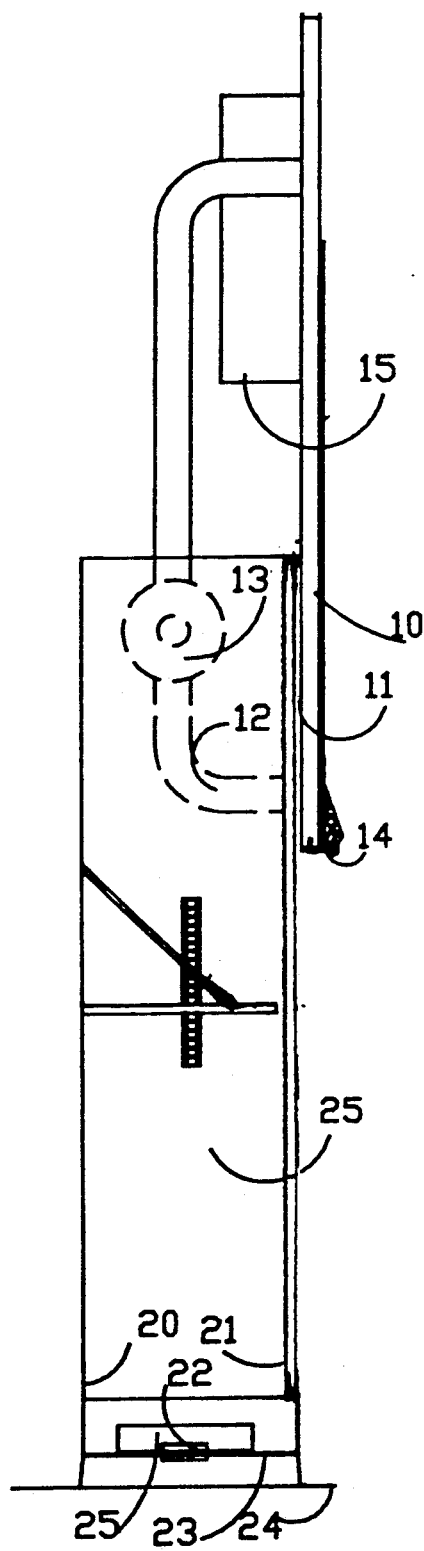
FIG. 13 A Section through presentation board holding arms, showing the detail and components of this system.
Figure 14:
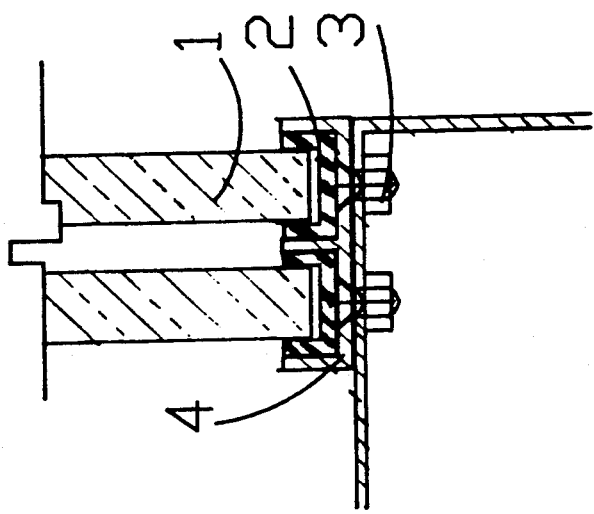
FIG. 14 Section through MFU front window glass display railing showing railing attachment to the body of MFU and interior of the railing.

This multi functional system (MFU) (FIG. 17 No. 1 and FIG. 2, No. 3) is comprised of the following major parts: display shelving unit, this display shelving unit as illustrated in FIG. 13 comprised of the following parts:

There is circular rotating plate (FIG. 17, No. 17 and FIG. 13, No. 23) mounted on top of vehicle floor (FIG. 13, No. 24) and can be pivoted 90 degrees to become parallel to the passenger side shelving unit. The body of said shelving unit is made out of a light weight metal comprising of top, bottom, side and rear panels. The front panel include a large display window with sliding glass (FIG. 4, No. 36). The sliding glass (FIG. 14, No. 1) is made out of special laminated safety glass suitable for use in vehicles and can slide along spacial type of track (FIG. 14, No. 2) that has a hard rubber interior to keep the glass firm in place and prevent said glass from making noise when vehicle is in motion. Said tracks are mounted to the top and bottom panel of display unit via screws and bolts as shown in FIG. 14, No. 3. (Refer to FIG. 4, 39C, 39D for front elevation).

Figure 15:
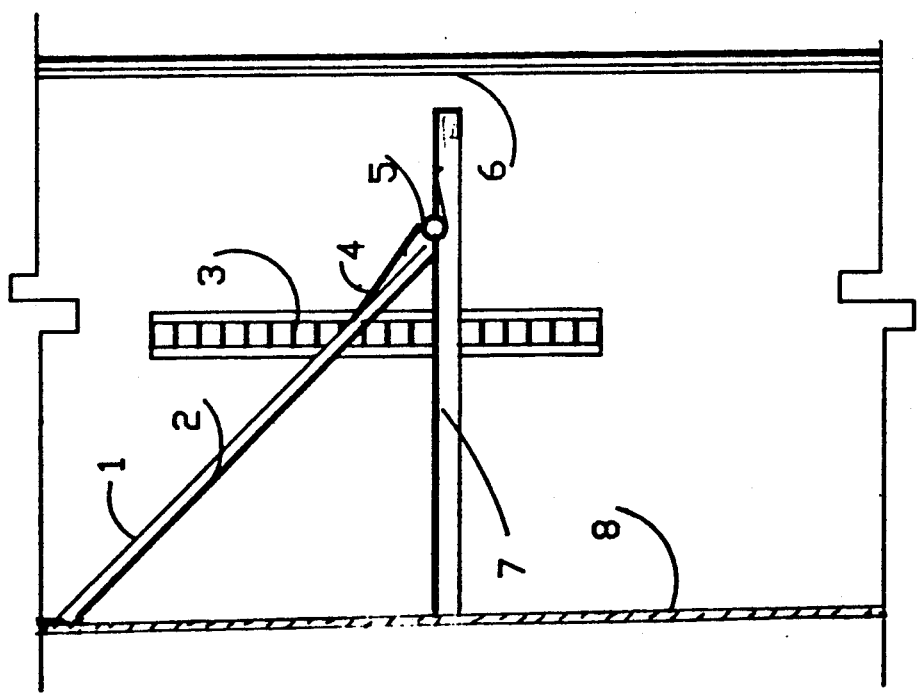
FIG. 15 Section through interior shelf of MFU, showing shelving horizontal panel, sloped display unit, display holding arm, holding spring and shelving standard.
Figure 15:
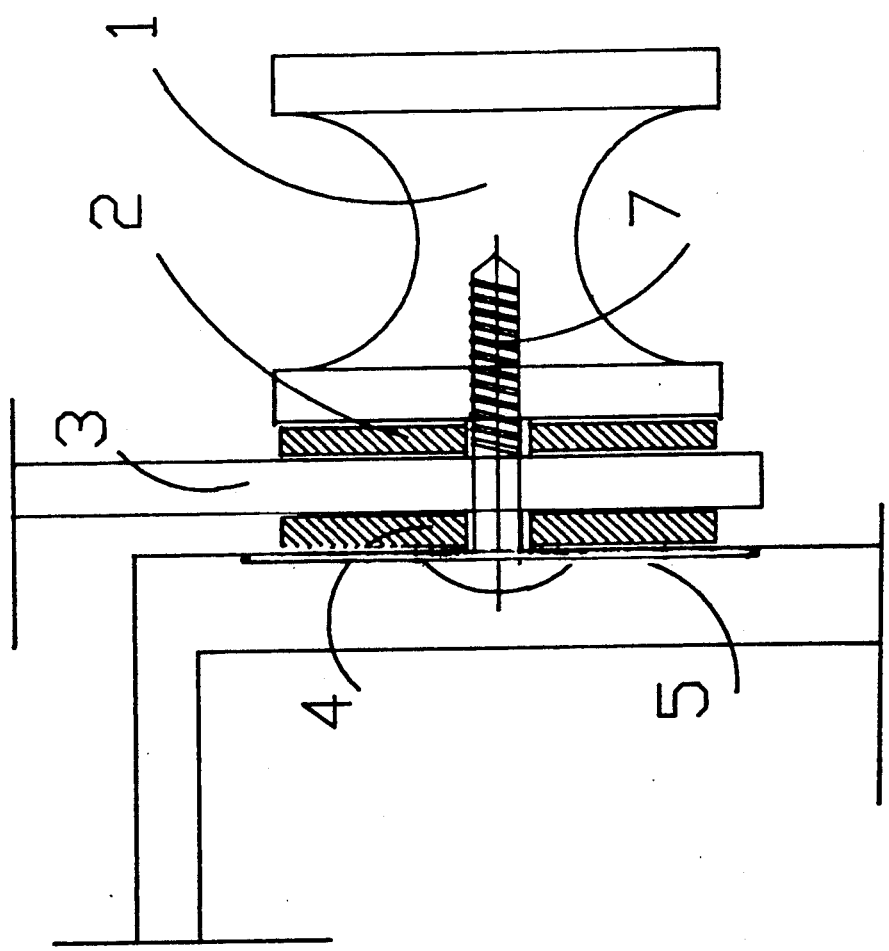

Inside said shelving display, there is an adjustable shelving panel as illustrated in FIGS. 13 and 15. This specially designed shelving display (FIGS. 13 and 15, No. 2) can be adjusted to various heights along standards (FIG. 15, No. 3) mounted in the interior side of vertical side panels of said display unit (FIG. 4, No. 39 F and FIG. 13 No. 25). This shelving display as illustrated in FIG. 15 comprises of various components:

A horizontal shelving panel (FIG. 15, No. 7) made out of a light weight metal having an extra sloped panel (FIG. 15, No. 2) used for resting literature, brochures and printed materials for display purposes. At the bottom of the sloped panel, where it joins the horizontal panel, there are at least two slots (FIG. 15 No. 5) that house springs connected to a continuous arm equal to the width of horizontal panel (FIG. 15, No. 4 and FIG. 4, 39K). Said springs holds said arm tight against said sloped panel at all times. This arm in turn keeps any brochures or papers (FIG. 15, No. 1) resting against sloped panel firm in place thus preventing display materials from moving when vehicle is in motion.

A special hook and knob (FIG. 4, No. 39H) secures side panel (FIG. 4, No. 39F) to the vehicle floor. On the top side of said vertical side panels (FIG. 5, No. 36), there are two large pivoting knobs (FIG. 5, No. 25 and FIG. 13, No. 13 and FIG. 15a, No. 1) which connect the desk top Pivoting Support system (FIG. 13, No. 12 and FIG. 15a, No. 3) to the side panels of display unit (FIG. 5, No. 36 and FIG. 13, No. 25). Pivoting Support system can be pivoted 90 degree around these knobs (FIG. 2, No. 16). This assembly comprised of a securing knob (FIG. 15a, No. 1), two rubber type washers (FIG. 15a, No. 2 & 4) in each side of pivoting support arm (FIG. 15a, No. 3) and two pivoting support arms. The pivoting support arm (FIG 15a, No. 3 and FIG. 13, No. 12) is a U shaped metal arm connected to the bottom of a horizontal surface panel (FIG. 13, No. 10) and has a hole that a long screw (FIG. 15a, No. 6) passes through, connecting side panel (FIG. 15a, No. 5) of display unit to the securing knob (FIG. 15a, No. 1).

The top surface panel (FIG. 13, No. 10) can be rotated in either direction around the said assembly, making it possible to use said top surface panel for variety of functions. By tightening these knobs the surface can be secured at any desired angles.

The horizontal top surface of the desk top unit (FIG. 5 No. 22 and FIG. 13, No. 10) is a multi functional surface that can be used as a projection screen, a drafting board, a desk and presentation board holding support.

Figure 13A:
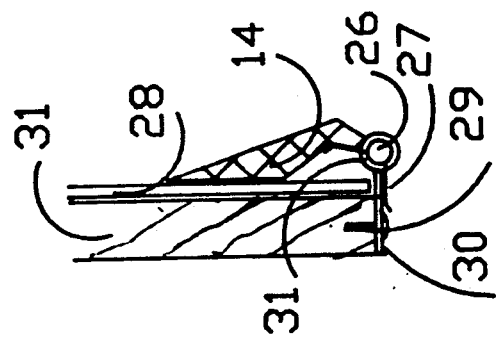

Said horizontal surface (FIG. 5, No. 22 and FIG. 13, No. 10) is made from ¼" laminated wood with white plastic laminate top surface. This surface can be pivoted from 0 to 90 degrees in either directions. There is a sliding straight edge parallel ruler installed over the desk top to facilitate drafting. Said surface can be pivoted to suitable angle for drafting purposes acting as drafting desk. Along the edge of the desk top facing the front seats, there is a continuous holding arm (FIG. 16, No. 11 and FIG. 13, No. 14) having a donut shaped base (FIG. 13 A, No. 31). There is a metal rod (FIG. 13 A, No. 26) passing through the base ring of the holding arm. This light weight metal rod is connected to a metal strip (FIG. 13a, No. 30) extending far enough to provide space for resting presentation boards (FIG. 13a, No. 28). Said metal strip is in turn connected to the side edge of the top surface via several flat head screws. (FIG. 13a, No. 29) There are a set of springs (FIG. 13A, No. 27) rolled around the metal rod (FIG. 13A, No. 27) tied to said holding arm (FIG. 13a-No. 14). Firm in place against the top surface (FIG. 13, No. 10). These arms keep presentation boards (FIG. 13a, No. 28) firm against the top surface (FIG. 13a, No. 31) when the top surface is used for presentation purposes. Moreover, when top surface is in horizontal position (FIG. 5, No. 22), arms can be used to hold papers and drawings firm in place while vehicle is in motion, thus eliminating the need to remove papers or letters from the desk top before driving the vehicle.

Said top surface can also be used in conjunction with the slide projector (FIG. 6, No. 4) mounted in front of the van. The top surface can be rotated to any required angle for projection purposes (FIG. 12, No. 17) and its white surface can be used in conjunction with slide projector mounted in over-head compartment (FIG. 2, No. 18) located in front of the vehicle.

There is a small drawer (FIG. 5, No. 21 and FIG. 13, No. 15) with locking mechanism) mounted underneath the top surface. This drawer is used to store personal items such as pens, pencils, erasers and other small items.

Under executive chair (FIG. 5, No. 30), there is a luggage compartment (FIG. 5, No. 43). This luggage compartment can be of various width or length depending on the type and make of the vehicle. Inside this luggage compartment, there can be extra batteries providing additional electrical power when vehicle engine is not running.

Shelving unit No. 3 as shown in FIG. 2 This shelving unit (FIG. 1, No. 8) which is located on rear section on the passenger side of the vehicle, comprised of the following components: TV monitor/receiver/video system (FIG. 2, No. 1) (Hereafter called TV system). This TV system is mounted over a pivoting plate (FIG. 2A, and FIG. 2B, No. 1) and the pivoting plate is mounted on top of a pivoting arm with locking mechanism (FIG. 2A, No. 3) and said arm is mounted from its bottom to horizontal shelving panel located underneath it (FIG. 2a, No. 2). There is a handle in front of the pivoting plate (FIG. 2B, No. 6) facilitating rotation of the TV system. To use TV system for video presentations or watching television or movies while seated in front seats of the vehicle, the plate is pivoted to any desirable angle using said handle and is secured in location via the locking system in pivoting arm. Said TV System is connected to TV Antenna mounted on the roof top unit.

Under the TV System, there is an AM/FM radio with cassette and compact disk player (FIG. 2, No. 9) mounted to the shelving system. Under said system, there are two special drawers one for storing video tapes (FIG. 2, No. 7) and one for storing audio cassettes and compact disks FIG. 2, No. 6). Said drawers are equipped with locking system to prevent moving when vehicle is in motion. The interior side of said storage area are covered with soft materials to prevent noise created by hitting tapes against the surface of the drawer while vehicle is in motion. Under said drawers, there is a multi purpose cabinet (FIG. 2, No. 12) with lockable door for various uses by the MMO user. This cabinet can house a copier machine if MMO user needs one. Under said cabinet, there is a special shelving unit with lockable doors for storing data processing media such as floppy diskettes.

There can be a sliding track door with security locks moving along two side tracks covering the entire front face of both shelving unit No. 2 and Business activity center if MMO user desires more security. The tracks extend vertically along the outer vertical shelving panels and via curved tracks, they extend horizontally parallel to the ceiling of the van between roof structure and ceiling of the vehicle. These doors can slide in their track upward and hide in horizontal tracks when shelving units are in use.

The side panel of shelving unit No. 3 as illustrated in FIG. 2 and 3 comprises of the following parts:

A mirror (FIG. 4, No. 1) for personal use, an overhead light (FIG. 4, No. 2) mounted above mirror, a sliding board (FIG. 3, No. 5) mounted on two side tracks underneath the mirror that can be pulled out and used to rest personal items, an AC/DC plug (FIG. 4, No. 6) A drawer (FIG. 4, No. 3) to store personal items such as electric shaver and a base cabinet (FIG. 3, No. 4) that can house a sink basin a water container, a facet and a waste water container.

There is an adjustable task light (FIG. 4 No. 8 and FIG. 2, No. 13) located over the desk. This light has built-in dimmer and can be controlled from the front console.

Over the roof of the van, near the rear-end, there is a multi functional roof top unit as illustrate in FIG. 2, No. 19).

Figure 7:
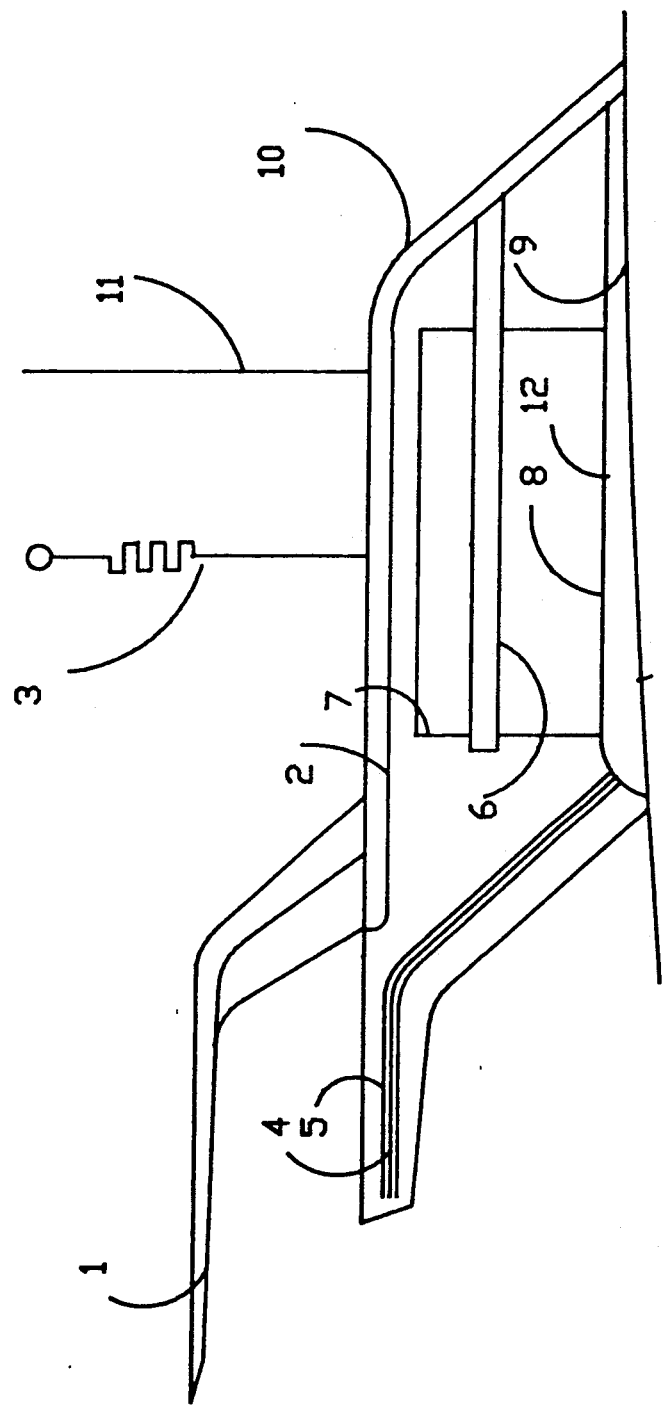
FIG. 7 is a section through rooftop unit showing its main components

This roof top unit is made of light weight metal or synthetic materials (FIG. 7, No. 10) shaped in such a special form as illustrated in FIG. 7 to act as an aerodynamic wind spoiler in addition to performing other functions. This unit comprises; A TV antenna (FIG. 7, No. 1), a telephone antenna (FIG. 7, No. 3), a CB radio antenna (FIG. 7, No. 11) mounted over the roof top unit (FIG. 7, No. 10) for best reception.

Inside the roof top unit there is a space for extra luggage. This luggage compartment has a corrugated horizontal panel (FIG. 7, No. 8) covered with special type of rubber mat (FIG. 7, No. 12). Said horizontal panel having a corrugated horizontal to surface mounted over the roof of vehicle (FIG. 7, No. 9). Said mat prevents damage to the roof of the vehicle and reduces the squeaking noise cause by sliding luggage. The corrugated metal underneath this mat strengthen the structure or the roof.

On the rear side of said roof top unit, there is lockable sliding door and tracks (FIG. 7 No. 4 & 5) providing stored luggage with security.

CONCLUSION AND RAMIFICATIONS

The reader sees that MMO of the subject invention, provides a highly efficient mobile office environment, while providing most of equipments, tools, and amenities a business person needs to perform various business functions in an integrated and highly efficient setting. While my above description contains many specifities, those should not be construed as limitations on the scope of the invention, but rather as an exemplification of one preferred embodiment thereof. The scope of the invention should be determined not by the embodiments illustrated, but by the appended claims and their legal equivalents.

A typical MMO is equipped with two telephones one located near the driver seat equipped with an answering machine, and one adjacent to working desk to facilitate communication with outside, a fax facsimile machine to enable the MMO user to receive and send printed massages, a computer to perform various tasks requiring computers, a TV monitor/receiver to make video presentations and dial regular TV channels, a printer to enable MMO user to have hard copies of computer files. Further more each MMO is equipped with some or all of the equipments listed below to enhances the work environment of the MMO users. These equipments comprises of:

A special coffee-maker, an electric pencil sharpener, AM/FM radio, cassette and compact disk player, video recorder/player, special shelving system, pen holders, letter trays and shelving, adjustable lighting systems, executive chair, slide projector, refrigerator, specially designed roll-up bed, coat closet AC/DC outlets, TV monitor/receiver, multi functional desk and drawer, presentation board holding rail, projection screen, slide projector, CB radio, swivel chairs, safe, TV antenna, telephone antenna, map holder, cup holder, wind spoiler, drawer, utility closet, drawings and blue print protector tube, lockable shelving, mirror and overhead light, luggage compartment, tool compartment, electric shaver and personal items drawers, and other items described in the summary of invention.

What is claimed is:

1. A motorized mobile office vehicle comprising:
a self-propelled vehicle; and
means defining an inner-space in said vehicle, said inner space including a business work area, said business work area being equipped with a multi-functional table apparatus capable of serving as a display rack, a projection screen, a drafting table and a desk top, whereby a person may conduct personal business activities within said business activity area, said multi-functional table apparatus having means for securing displays and printed matters secure in place while said multi functional table apparatus is in motion.

2. A motorized mobile office vehicle as in claim 1, wherein said business activity area includes at least on seat, said seat being capable of use in operation of said self-propelled vehicle and of rotating so as to face said business area of said vehicle.

3. A motorized mobile office vehicle as in claim 1 wherein said business activity area includes an overhead console having means for projecting slide pictures, means for outside communications, and means for providing overhead task lighting.

4. A motorized mobile office vehicle as in claim 1 wherein said business activity area further comprises a front console comprising means for communications with outside, storing and retrieving voice messages as well as means for holding maps, cups, note pads, cassette tapes, and other miscellaneous items.

5. A motorized mobile office vehicle as in claim 1, wherein said business activity area includes a multi-functional unit apparatus, said unit being capable of serving as a display shelving unit, display rack, a projection screen, a drafting table and a desk top.

6. A motorized mobile office vehicle as in claim 1, wherein said business activity area further includes a shelving unit comprising a hi-fi speaker, means adapted for use in said self-propelled vehicle for storing printed matters and data processing disks, means for storing personal and valuable items, a data processing means and a printing device, said data processing disks, said data processing means being adapted for use in said self-propelled vehicle whereby the data processing means and data processing paper may be secured in place, an electric pencil sharpener and a pencil holder, a telephone and a fax facsimile machine, a coffee maker, a micro-wave oven, a refrigerator, a utility/tool box, a shelving unit, book supports adapted for use in said self-propelled vehicle.

7. A motorized mobile office vehicle as in claim 1, wherein said business activity area further includes a swivel-type executive chair slidably mounted to a track affix to a top portion of a rear luggage compartment provided in said self-propelled vehicle.

8. A motorized mobile office vehicle as in claim 1, wherein said business activity area further includes one vehicle back wall and two opposing vehicle side walls, and a roll-up bed, said bed comprising:
a pair of support tracks mounted to said vehicle back wall;
a rotating central support pipe slidably mounted to said pair of support tracks;
a mattress, supported by said support pipe in such a fashion so as to permit the rolling and unrolling of said mattress around said support pipe, said mattress being constructed of a fabric whereby the weight of two persons may be supported;
a mounting hook secured to vehicle ceiling, whereby said mattress is capable of being unrolled form said rotating central support pipe and being supported by said mounting hooks.

9. A motorized mobile office vehicle, as in claim 1, wherein said business activity area further includes means for protectively storing drawings and blueprints.

10. A motorized mobile office vehicle as in claim 1, wherein said business activity area further includes a shelving unit comprising of various audio/visual equipment, means for storing audio/visual tapes and a sink basin provided with a water reservoir whereby water flows into said sink basin.

11. A motorized mobile office vehicle, as in claim 1, wherein said business activity further includes a multi-functional roof top unit mounted on a roof portion of said vehicle, said roof top being shaped in such a way so as to act as a wind spoiler, said roof top unit further including a television antenna, a telephone antenna, and a CB radio antenna, said antennas being mounted to said roof top unit whereby a signal reception may be improved, said roof top unit further including a means defining an inside space capable of storing luggage, and a sliding door mounted to said roof top unit and capable of locking engagement with said roof portion.

12. A motorized mobile office vehicle, as in claim 1, wherein said business activity area further includes a multi functional table apparatus comprising:
   a base;
   a support plate pivotally mounted on said base;
   at least one vertically extending support member secured to said support plate;
   a support arm pivotally mounted to at least one of said vertically extending support members; and;
   a generally planar, pivotally mounted said support arms.

13. A multi-functional table apparatus in claim 12, wherein said top surface further includes a paper and display restraining apparatus comprising;
   a holding arm pivotally mounted to a holding rod capable of restraining flat materials during vehicular movement.

14. A motorized mobile office vehicle, as in claim 1, wherein said business activity area further includes a shelving unit comprising:
   a pair of vertically extending support members mounted to said vehicle;
   at least one shelf mounted to said pair of support members;
   a support track mounted on said shelf;
   at least one sliding support mounted within said support track and means for adjustably securing said sliding support at any point along said track; and
   at least one adjustable restraining strap mounted to extend between said at least one sliding support and one of said vertically extending support members whereby items on said shelf will be restrained during vehicular movement.

15. A motorized mobile office vehicle as in claim 1, wherein said business activity area further includes an electric coffee/tea maker apparatus adapted for use in vehicle comprising;
   a frame and two holding arms capable of securely restraining a liquid container placed between said arms during vehicular movement.

16. A motorized mobile vehicle comprising:
   a self-propelled vehicle; and
   means defining an inner-space in said vehicle, said inner space including a business work area, said business work area being equipped with a multi-functional table apparatus capable of serving as a display rack, a projection screen, a drafting table and a desk top, whereby a person may conduct business activities with said business activity area, said multi functional table apparatus comprising:
   a base;
   a support plate pivotally mounted on said base;
   at least one vertically extending support member secured to said support plate;
   a support arm pivotally mounted to at least one of said vertically extending support members; and;
   a generally planar, pivotally mounted said support arms.

* * * * *